(12) United States Patent
Laroche et al.

(10) Patent No.: US 9,636,995 B2
(45) Date of Patent: May 2, 2017

(54) RADIATOR ASSEMBLY FOR A VEHICLE

(71) Applicant: BOMBARDIER RECREATIONAL PRODUCTS INC., Valcourt (CA)

(72) Inventors: David Laroche, Sherbrooke (CA); Sebastien Lavoie, Valcourt (CA)

(73) Assignee: BOMBARDIER RECREATIONAL PRODUCTS INC., Valcourt (CA)

( * ) Notice: Subject to any disclaimer, the term of this patent is extended or adjusted under 35 U.S.C. 154(b) by 0 days.

(21) Appl. No.: 15/021,557

(22) PCT Filed: Sep. 15, 2014

(86) PCT No.: PCT/IB2014/064533
§ 371 (c)(1),
(2) Date: Mar. 11, 2016

(87) PCT Pub. No.: WO2015/036985
PCT Pub. Date: Mar. 19, 2015

(65) Prior Publication Data
US 2016/0229283 A1    Aug. 11, 2016

Related U.S. Application Data

(60) Provisional application No. 61/910,084, filed on Nov. 28, 2013, provisional application No. 61/877,645, filed on Sep. 13, 2013.

(51) Int. Cl.
*B60K 11/04* (2006.01)
*B60K 11/08* (2006.01)
(Continued)

(52) U.S. Cl.
CPC .............. *B60K 11/04* (2013.01); *B60K 11/08* (2013.01); *B62D 25/084* (2013.01); *B62D 25/085* (2013.01)

(58) Field of Classification Search
CPC ........ B60K 11/04; B60K 11/08; B62K 5/027; B62K 5/05
See application file for complete search history.

(56) References Cited

U.S. PATENT DOCUMENTS 3,851,630 A    12/1974 Foster
4,618,020 A    10/1986 Noda et al.
(Continued)

FOREIGN PATENT DOCUMENTS

FR            977123 A      3/1951
WO    2013/095881 A1    6/2013

OTHER PUBLICATIONS

International Search Report with regard to PCT/2014/064533 mailed on Jan. 6, 2015.
(Continued)

*Primary Examiner* — Bryan Evans
(74) *Attorney, Agent, or Firm* — BCF LLP

(57) ABSTRACT

A vehicle has a frame defining a longitudinal axis, a straddle seat, left and right front wheels, at least one rear wheel, a motor and a front cowling assembly being supported by the frame. At least a portion of an air inlet defined in the front cowling assembly faces forwardly. An air outlet is defined in the front cowling assembly and fluidly communicating with the air inlet. At least a portion of the air outlet faces laterally outwardly. A radiator fluidly communicating with the motor is enclosed at least in part by the front cowling assembly. At least a portion of the air flowing from the air inlet flows through the air outlet and through the radiator. A projection of the radiator on a longitudinally disposed vertical plane is greater than a projection of the radiator on a laterally disposed vertical plane.

20 Claims, 17 Drawing Sheets

(51) Int. Cl.
*B62K 5/05* (2013.01)
*B62D 25/08* (2006.01)

(56) References Cited

U.S. PATENT DOCUMENTS

| | | | |
|---|---|---|---|
| 5,715,778 A * | 2/1998 | Hasumi | B60K 11/04 |
| | | | 123/196 AB |
| 5,992,554 A * | 11/1999 | Hasumi | B60K 11/04 |
| | | | 123/41.51 |
| 7,380,624 B2 | 6/2008 | Momosaki | |
| 7,543,672 B2 | 6/2009 | Codere et al. | |
| 7,654,357 B2 * | 2/2010 | Buell | F01P 3/18 |
| | | | 180/229 |
| 7,806,215 B2 | 10/2010 | Codere et al. | |
| 8,539,929 B2 | 9/2013 | Dees et al. | |
| 2004/0035623 A1 | 2/2004 | Fecteau et al. | |
| 2005/0217909 A1 | 10/2005 | Guay et al. | |
| 2005/0257972 A1 | 11/2005 | Iwami et al. | |
| 2013/0186701 A1 | 7/2013 | Bedard et al. | |

OTHER PUBLICATIONS

English Translation of FR977123 (Description and Claims) retrieved on Espacenet on Mar. 10, 2016.

\* cited by examiner

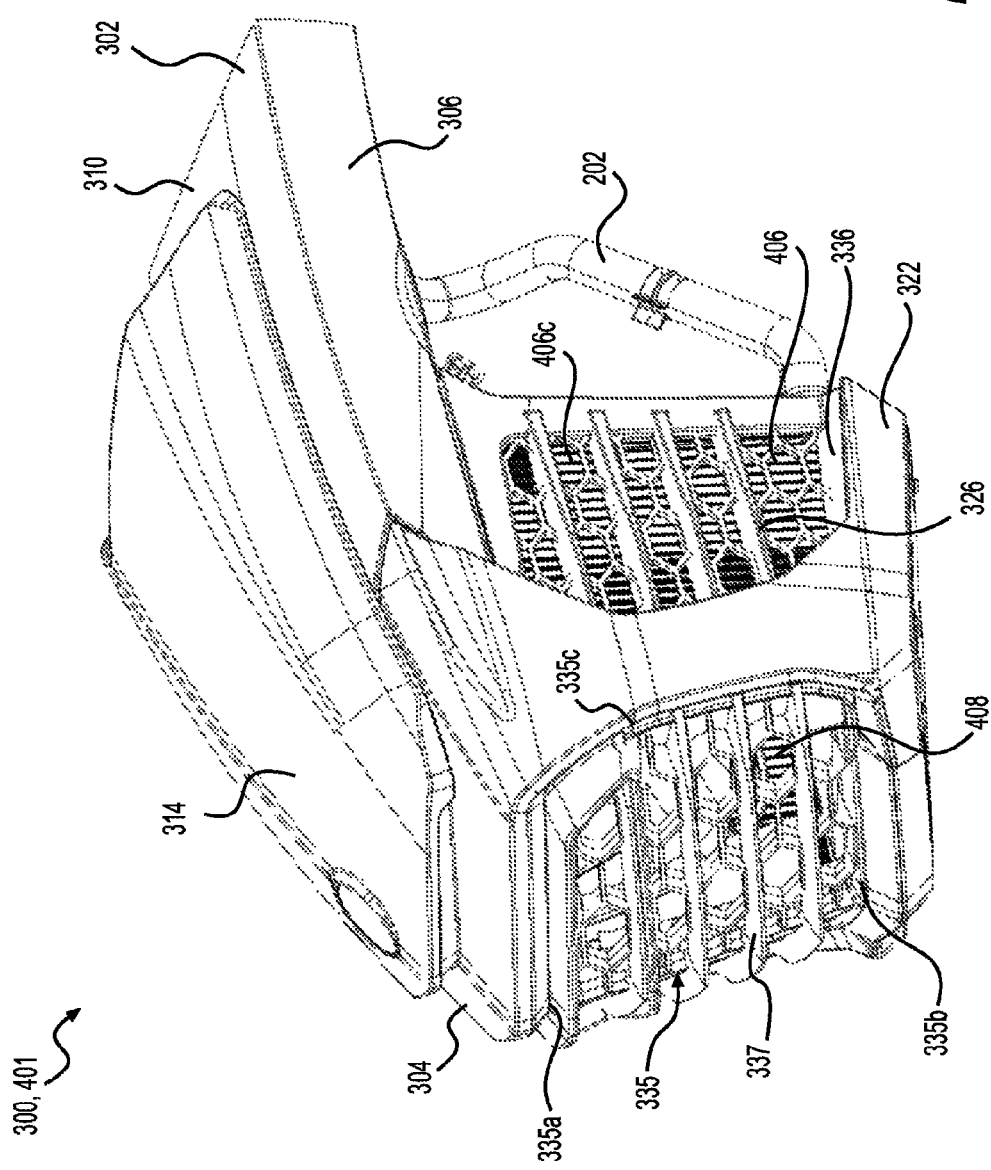

RADIATOR ASSEMBLY FOR A VEHICLE

CROSS-REFERENCE

The present application claims priority to U.S. Provisional Patent Application No. 61/877,645 filed on Sep. 13, 2013 and U.S. Provisional Patent Application No. 61/910,084 filed on Nov. 28, 2013, the entirety of which are incorporated herein by reference.

FIELD OF THE TECHNOLOGY

The present technology relates to a radiator assembly for a vehicle.

BACKGROUND

Internal combustion engines operate by combusting a mixture of fuel and air inside one or more combustion chambers. The combustion process generates a considerable amount of heat causing the engine and surrounding components to become heated. In order to operate properly, the heated engine needs to be cooled. Although the engine can be air cooled, many engines are now liquid cooled. In liquid-cooled internal combustion engines, a coolant runs through the engine to absorb some of the heat generated by the engine. The hot coolant then runs through one or more radiators to be cooled. The cooled coolant is then returned to the engine and the cycle is repeated. In order to operate efficiently, the radiators need air to flow over them in order to absorb heat from the cooling liquid. In small vehicles, locating the radiators such that they have sufficient airflow can be challenging.

Therefore, there is a need for an arrangement of radiators that enables adequate supply of air for cooling the engine without significantly increasing vehicle size.

SUMMARY

It is an object of the present technology to ameliorate at least some of the inconveniences mentioned above.

In accordance with one aspect of the present technology, there is provided a vehicle having a frame defining a longitudinal axis, a straddle seat supported by the frame, a left front wheel and a right front wheel operatively connected to the frame, and at least one rear wheel connected to the frame. A motor is connected to at least one of the wheels. A front cowling assembly is supported by the frame. An air inlet is defined in the front cowling assembly, at least a portion of the air inlet facing forwardly. An air outlet is defined in the front cowling assembly and fluidly communicates with the air inlet. At least a portion of the air outlet faces laterally outwardly. A radiator fluidly communicates with the motor and is enclosed at least in part by the front cowling assembly, at least a portion of the air flowing from the air inlet flows through the air outlet and through the radiator. A projection of the radiator on a vertical plane disposed longitudinally is greater than a projection of the radiator on a vertical plane disposed laterally.

In some implementations, the radiator is connected to the front cowling assembly around the air outlet.

In some implementations, the radiator is connected to the front cowling assembly around the air outlet to receive air flowing out of the outlet.

In some implementations, the inlet surface of the radiator is disposed parallel to the longitudinal centerplane.

In some implementations, the front cowling assembly further comprises a deflector directing air from the air inlet towards the air outlet.

In some implementations, the air outlet is defined by the deflector.

In some implementations, the radiator is connected to the deflector.

In some implementations, a direction of airflow through the air outlet is at a non-zero angle with respect to a direction of airflow through the air inlet, the angle being greater than 45 degrees and less than 135 degrees.

In some implementations, the angle is greater than 80 degrees and less than 100 degrees.

In some implementations, a fan is adapted to force air through the radiator.

In some implementations, an inlet surface of the radiator faces the fan.

In some implementations, an inlet surface of the radiator faces the fan and the air outlet.

In some implementations, the fan is disposed in the air outlet.

In some implementations, a left front suspension assembly connects the left front wheel to the frame, and a right front suspension assembly connects the right front wheel to the frame. The radiator is disposed longitudinally forward of the left and right front suspension assemblies.

In some implementations, a left driver footrest is connected to the frame and extends leftwardly therefrom. The left driver footrest is disposed vertically lower than the straddle seat. A right driver footrest is connected to the frame and extends rightwardly therefrom. The right footrest is disposed vertically lower than the straddle seat. The radiator is disposed laterally between at least a portion of the left and right driver footrests.

In some implementations, the air outlet is a left air outlet, the at least one portion of the left air outlet faces leftwardly, and the radiator is a left radiator. A right air outlet is defined in the front cowling assembly and fluidly communicating with the air inlet. At least a portion of the right air outlet faces rightwardly. A right radiator is fluidly communicating with the motor and enclosed at least partly by the front cowling assembly. A least a portion of the air flowing from the air inlet flows through the right air outlet and the right radiator. A projection of the right radiator on a vertical plane disposed longitudinally is greater than a projection of the right radiator on a vertical plane disposed laterally.

In some implementations, the front cowling assembly includes a deflector. The deflector has a left deflector wall portion directing air from the air inlet towards the left air outlet and a right deflector wall portion directing air from the air inlet towards the right air outlet.

In some implementations, a storage bin is enclosed at least in part by the front cowling assembly. The storage bin is disposed laterally between the left and right radiators. The storage bin is disposed longitudinally rearward of at least a portion of the deflector.

In some implementations, a front surface of the storage bin is congruous with a rear surface of the deflector.

In some implementations, a left fan is adapted to direct air through the left radiator and a right fan is adapted to force air through the right radiator. An inlet surface of the left radiator faces the left fan. An inlet surface of the right radiator faces the right fan.

In some implementations, a left front suspension assembly connects the left front wheel to the frame and includes a left upper A-arm and a left lower A-arm. The left radiator is disposed in front of the left A-arms. A right front suspension assembly connects the right front wheel to the frame and includes a right upper A-arm and a right lower A-arm. The right radiator is disposed in front of the right A-arms.

In some implementations, a left driver footrest is connected to the frame and disposed vertically lower than the straddle seat. A right driver footrest is connected to the frame and disposed vertically lower than the straddle seat. The left radiator is disposed laterally between at least a portion of the left driver footrest and the longitudinal centerplane. The right radiator is disposed laterally between at least a portion of the right driver footrest and the longitudinal centerplane.

In some implementations, a left passenger footrest and a right passenger footrest are each connected to the frame. The left passenger footrest is disposed vertically lower than the straddle seat and rearward of the left driver footrest. The right passenger footrest is disposed vertically lower than the straddle seat and rearward of the right driver footrest. The left radiator is disposed laterally between at least a portion of the left passenger footrest and the longitudinal centerplane. The right radiator is disposed laterally between at least a portion of the right passenger footrest and the longitudinal centerplane.

In some implementations, the left passenger footrest is connected to the frame at a location disposed rightwardly of the left radiator in the lateral direction, and the right passenger footrest is connected to the frame at a location disposed leftwardly of the right radiator in the lateral direction.

For the purpose of this application, terms related to spatial orientation such as downwardly, rearwardly, forward, front, rear, left, right, above and below are as they would normally be understood by a driver of the vehicle sitting thereon in a normal driving position. Definitions of terms provided herein take precedence over definitions of the terms that may be provided in any of the documents incorporated herein by reference.

Implementations of the present vehicle each have at least one of the above-mentioned object and/or aspects, but do not necessarily have all of them. It should be understood that some aspects of the present vehicle that have resulted from attempting to attain the above-mentioned object may not satisfy this object and/or may satisfy other objects not specifically recited herein.

Additional and/or alternative features, aspects, and advantages of implementations of the present vehicle will become apparent from the following description, the accompanying drawings, and the appended claims.

BRIEF DESCRIPTION OF THE DRAWINGS

For a better understanding of the present technology, as well as other aspects and further features thereof, reference is made to the following description which is to be used in conjunction with the accompanying drawings, where:

FIG. 3A is a perspective view, taken from a front left side, of the front cowling assembly and radiator assembly of FIG. 2;

DETAILED DESCRIPTION

The present description is provided with respect to a three-wheel vehicle 10. However, it should be understood that other types of straddle-type vehicles such as, for example, three or four wheel all-terrain vehicles are also contemplated. Aspects of the technology could also be applied to two-wheel straddle seat vehicles such as motorcycles.

Figure 1:
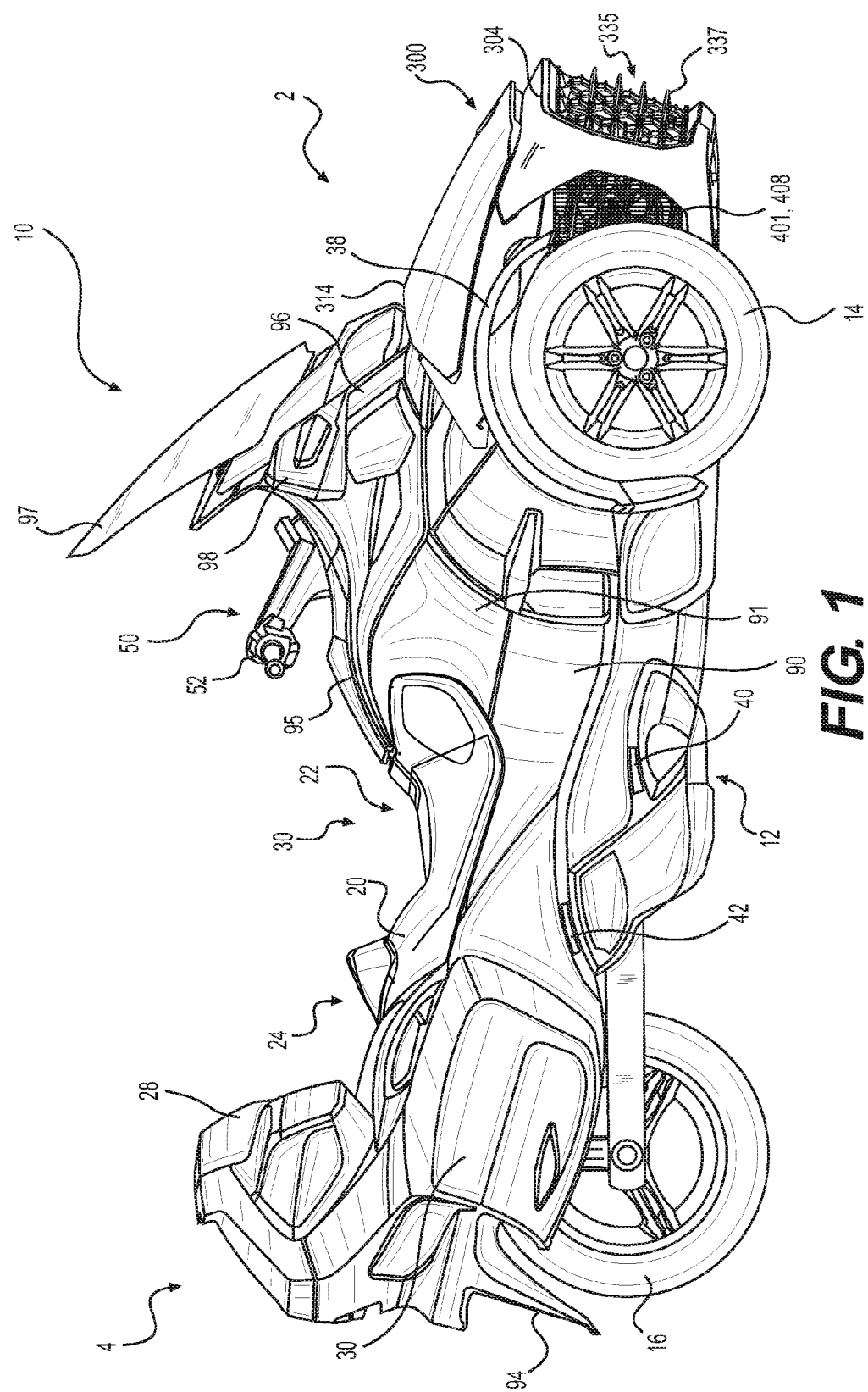
FIG. 1 is a right side elevation view of a three-wheel vehicle.
Figure 14:
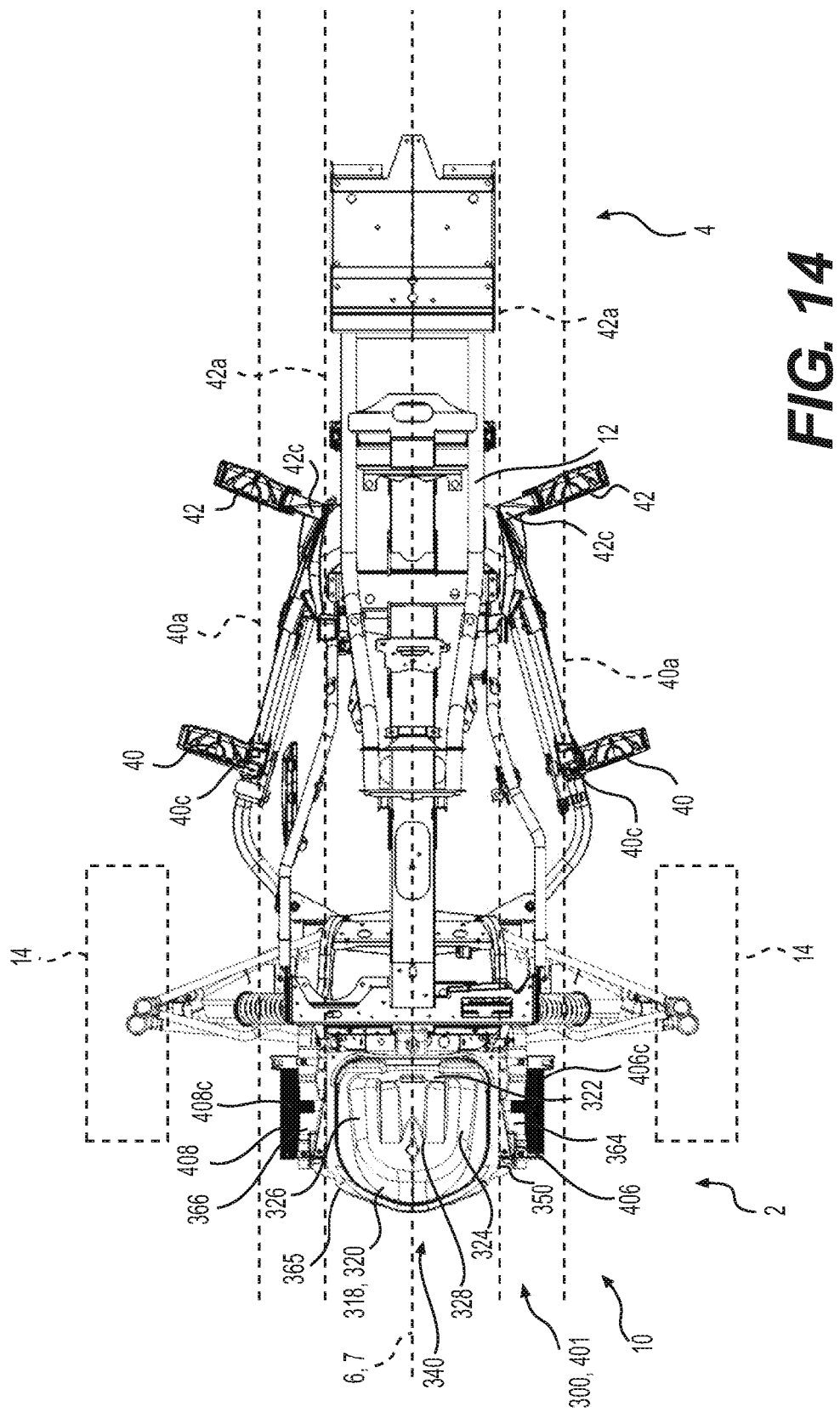
FIG. 14 is a top plan view of the radiator assembly, deflector and storage bin of FIG. 6 shown with a portion of the frame and the front suspension assembly of the vehicle of FIG. 1.

With reference to FIG. 1, a vehicle 10 has a front portion 2 and a rear portion 4 defined consistently with the forward travel direction of the vehicle 10. The vehicle 10 has a frame 12 which defines a longitudinal centerline 6 (FIG. 14). A longitudinal centerplane 7 (FIG. 14) is defined by a vertical plane passing through the longitudinal centerline 6. The vehicle 10 is a three-wheel vehicle 10 including a left front wheel 14, a right front wheel 14 and a single rear wheel 16. It is however contemplated that the vehicle 10 could have more than one rear wheel 16. A front suspension assembly 17 connects the front wheels 14 to the frame 12. A rear suspension assembly (not shown) connects the rear wheel 16 to the frame 12. The front wheels 14 are equally offset from the longitudinal centerline 6 in the lateral direction, and the rear wheel 16 is aligned with the longitudinal centerline 6. The left and right front wheels 14 and the rear wheel 16 each have a tire secured thereto. It is contemplated however that the front wheels 14 or the rear wheel 16 could have more than one tire secured thereto. A motor 32 (shown schematically in FIG. 2) is operatively connected to the rear wheel 14 to drive the rear wheel 16. It is contemplated that the motor 32 could be connected to the front wheels 14 instead of, or in addition to, the rear wheel 16. In the illustrated implementation of the vehicle 10, the motor 32 is in the form of an internal combustion engine. It is contemplated that the motor 32 could be other than an internal combustion engine. For example, the motor 32 could be an electric motor, a hybrid, or the like. Although, the motor 32 will be referred to as an engine 32 hereinafter, it should be understood that the description below is not to be limited to an internal combustion engine.

The front suspension assembly 17 includes a left front suspension assembly 18 and a right front suspension assembly 17. The left front wheel 14 is rotatably connected to the frame 12 via the left front suspension assembly 18. The right front wheel 14 is rotatably connected to the frame 12 via the right front suspension assembly 17.

Figure 15:
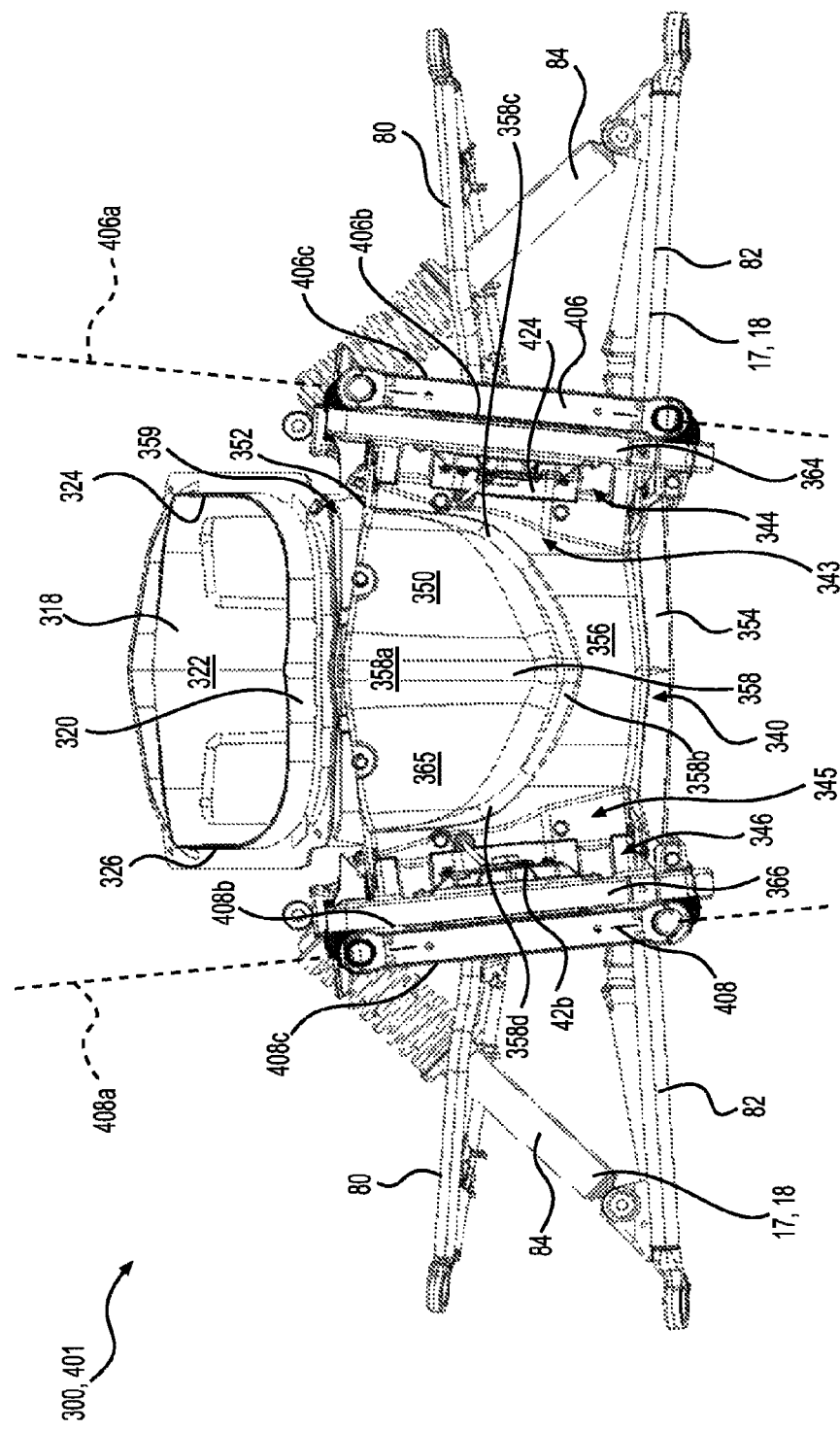
FIG. 15 is a front elevation view of the radiator assembly, deflector, storage bin and front suspension assembly of FIG. 14.
Figure 16:
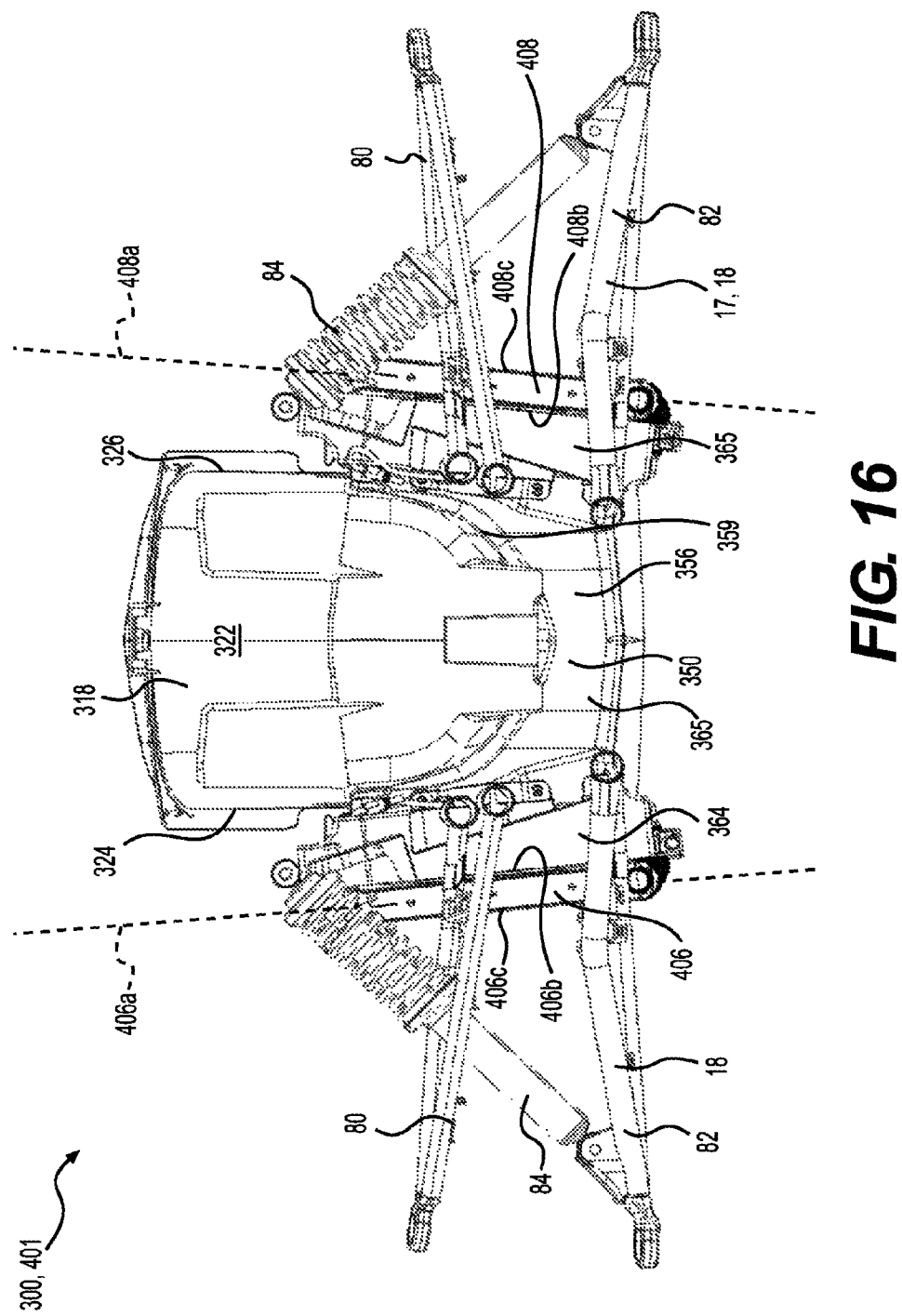
FIG. 16 is a rear elevation view of the radiator assembly, deflector, storage bin and front suspension assembly of FIG. 15.

As the left suspension assembly 18 is a mirror image of the right suspension assembly 18, only the left suspension assembly 18 will be described. With reference to FIGS. 14 to 16, the left front suspension assembly 18 is a double A-arm type suspension, also known as a wishbone suspension. The left front suspension assembly 18 includes a left upper A-arm 80, a left lower A-arm 82 and a left shock absorber 84. Each A-arm 80, 82 is formed of a front member and a rear member connected together at their left (outer) ends and spaced apart at their right (inner) ends. The shock absorber 84 includes a hydraulic damper surrounded by a coil spring. The lower end of the shock absorber 84 is connected to the left end of the lower A-arm 82. The shock absorber 84 extends upwards and rightwards from the left end of the left lower A-arm 82, passing between the front and rear members of the upper A-arm 82. An upper end of the shock absorber 84 is connected to the frame 12.

It is contemplated that the front suspension assembly 17 could be constructed differently than as shown herein. It is contemplated that the left shock absorber 84 could be connected to the upper A-arm 80 instead of the lower A-arm 82. It is contemplated that the left and right front suspension assemblies 17 could have only one A-arm. It is further contemplated that the front suspension assembly could be constructed of members other than A-arms 80, 82 as shown herein.

The vehicle 10 is a straddle-type vehicle having a straddle seat 20 along the longitudinal centerline 6 and supported by the frame 12. The straddle seat 20, adapted to accommodate two adult-sized riders, includes a forward seat portion 22 for the driver and a rear seat portion 24 for a passenger. It is contemplated that the three-wheel vehicle 10 could not have the rear seat portion 24, and could be adapted to accommodate only the driver. A central cargo box 28 is provided behind the rear seat portion 24. A pair of side cargo boxes 30 is mounted to a rear left and rear right side of the three-wheel vehicle 20 below the rear seat portion 24. It is contemplated that the cargo boxes 28, 30 could be omitted.

A pair of driver footrests 40, in the form of footpegs, is provided on either side of the vehicle 10 below the first portion 22 of the straddle seat 20 for a driver to rest his feet thereon. Similarly a pair of passenger footrests 42, in the form of foot pegs, is provided on either side of the vehicle 10 below the second portion 24 of the straddle seat 12 for a passenger to rest his feet thereon.

A steering assembly 50 is disposed forwardly of the straddle seat 20 to allow a driver to steer the two front wheels 14. The steering assembly 50 includes a handlebar 52, a steering column (not shown) and steering linkages (not shown) connected to the front wheels 14 such that turning the handlebars 52 turns the wheels 14.

The frame 12 supports and houses the vehicle powerpack including the motor 32 and other components connected thereto, such as a transmission (not shown), a battery (not shown) and the like. The engine 32 (shown schematically in FIG. 1) is located between the straddle seat 20 and front wheels 14. The engine 32 is an inline three-cylinder four-stroke internal combustion engine, but it is contemplated that other types of internal combustion engines could be used.

The engine 32 is liquid-cooled. The vehicle 10 has an engine cooling system including a radiator assembly 401 (FIG. 3) and a coolant tank (not shown). Although the cooling system 200 described herein is used for cooling the engine 32, it is contemplated that the cooling system 200 could be used for cooling a motor 32 of the vehicle 10 and/or other components connected thereto (i.e. the powerpack). It is contemplated that the cooling system could use a fluid in a gaseous state instead of a liquid coolant. The radiator assembly 401 includes a pair of radiators 406, 408 (FIG. 2) and a pair of fans 424, 426 (FIG. 6) and will be discussed below in further detail. The engine cooling system also includes hoses (one of the hoses 202 is shown in FIG. 3A) for carrying liquid coolant between the engine 32, coolant tank and the radiators 406, 408. Liquid coolant flows through passages formed in the engine 32 to absorb heat from the engine 32, thereby cooling the engine 32. From the engine 32, the hot coolant flows via the hose 202 to the bottom of left and right radiators 406, 408. The coolant then flows upwardly through conduits in the radiators 406, 408. Air flowing through the radiators 206, 208 absorbs heat from the coolant, thereby cooling the coolant. The cooled coolant then flows from the top of the radiators 406, 408 into another hose (not shown) to be returned to the engine 32 to cool the engine 32. One or more pumps (not shown) cause the coolant to flow through the above-described circuit. The pumps can be electrical or mechanically driven by the engine 32. The coolant tank is connected to the engine 32 such that the coolant tank can receive and supply coolant from and to the engine 32 should there be an insufficient amount of coolant flowing through the engine 32 or an expansion of the coolant flowing therethrough.

Fairings 90 enclose and protect the internal components of the three-wheel vehicle 10, including the engine 32. The fairings 90 are connected to the vehicle frame 12. The fairings 90 include side panels 91 disposed below and on each side of straddle seat 20, a rear deflector 94 extending over the rear wheel 16, and an upper fairing 95 extending forwardly of the straddle seat 20 and downwardly on both sides of vehicle 10 to cover the top portion of the engine 32. Fairings 90 also include an upper segment 96 to which are mounted a windshield 97, a pair of side view mirrors 98 and a dashboard panel (not shown) for mounting various gauges and indicators. The fairings 90 also include a front cowling assembly 300 extending around a front of the vehicle 10.

Turning now to FIGS. 2 to 16, the front cowling assembly 300 will be described below in further detail. The front cowling assembly 300 defines an internal volume inside which a front portion of the engine 32, portions of the engine cooling system, portions of the radiator assembly 401, and a storage bin 318 are enclosed.

With reference to FIGS. 2 to 5, the front cowling assembly 300 includes an upper cowling 302, a lower cowling 304 and a hood 314. The upper cowling 302 and the lower cowling 304 are connected to the frame 12 and to each other by fasteners.

The lower cowling 304 extends around a front of the vehicle 10 and defines an opening 335. The opening 335 serves as an air inlet for air flow to the radiators 406, 408 for cooling the engine 32. The opening 335 is therefore referred to herein as the air inlet 335. The longitudinal centerplane 7 bisects the air inlet 335. The air inlet 335 faces generally toward the front of the vehicle 10. When the vehicle 10 moves forward, air flowing parallel to the longitudinal centerplane 7 relative to the vehicle 10 enters into the air inlet 335 into the space enclosed by the front cowling assembly 300. The air inlet 335 has a rectangular shape with a horizontal top edge 335a, a horizontal bottom edge 335b, and vertical left and right edges 335c connecting the top edge 335a with the bottom edge 335b.

The air inlet 335 is covered by a grill 337 to help prevent entry of large debris. The grill 337 includes a hexagonal lattice extending over the inlet 335 surrounded by a frame that fits over the edges 335a, 335b, 335c, 335d of the air inlet 335a. Although the grill 337 shown herein is formed as a single piece, it is contemplated that the grill 337 could be assembled from two or more parts. Four blades extending horizontally from a left side of the grill frame to a right side thereof the frame. The blades are disposed forwardly of the hexagonal lattice. It is contemplated that the blades could help to streamline (or straighten) airflow into the air inlet 335.

The upper cowling 302 extends above the lower cowling 304 and reawards therefrom. A left portion 306 of the upper cowling 302 extends rearward from a top left corner of the lower cowling 304. A right portion 308 of the upper cowling 302 extends rearward from a top right corner of the lower cowling 304. A rear portion 310 of the upper cowling 302 connects the rear ends of the left portion 306 and the right portion 308.

The hood 314 extends rearward from the upper edge of the lower cowling 304 to the rear portion 310 of the upper cowling 302. The hood 314 extends laterally between the left and right portion 306, 308 of the upper cowling 302. The hood 314 is connected by a hinge (not shown) at a front thereof to the lower cowling 304. The hinge is received in a recess 316 (FIG. 5) formed in the upper edge of the lower cowling 304. The rear edge of the hood 314 can be pivoted upwardly from the upper cowling 302 to an open position to provide access to the storage bin 318. It is contemplated that the hood 314 could be connected by a hinge at a rear thereof to the upper cowling 302. It is also contemplated that the hood 314 could be removable. A storage bin 318 is disposed under the hood 314 when the hood 314 is in the closed position illustrated in FIGS. 2 to 4. The storage bin 318 is described below with reference to FIGS. 6 to 8 and 10.

As can be seen in FIG. 3A, a lower left portion 322 of the lower cowling 304 extends rearwardly below the upper cowling left portion 306. The lower left portion 322 of the lower cowling 304 is spaced from the upper cowling left portion 306. A left opening 326 is formed between the left portions 306, 322 of the upper and lower cowlings 302, 304. A left radiator 406 is disposed laterally inward of the left portions of the upper and lower cowlings 302, 304 and aligned with the left opening 326. A grill 336 is connected between the left portions of the upper and lower cowlings 302, 304 to help prevent entry of large debris through the left opening 326 into the left radiator 406.

Figure 3B:
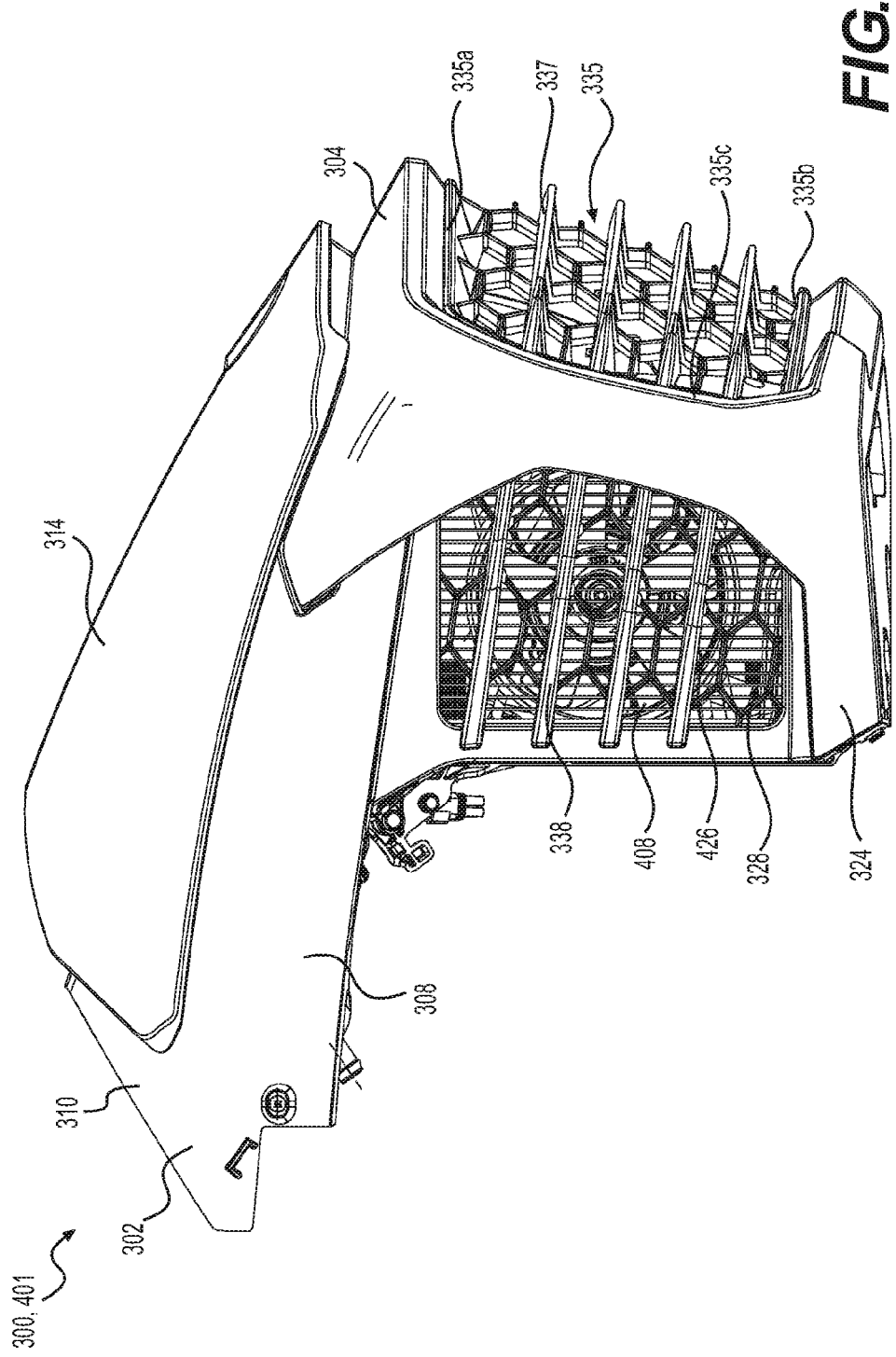
FIG. 3B is a right side elevation view of the front cowling assembly and radiator assembly of FIG. 2.

As can be seen in FIG. 3B, a lower right portion 324 of the lower cowling 304 extends rearwardly below the upper cowling right portion 308 and spaced therefrom. A right opening 328 is formed between the right portions 308, 324 of the upper and lower cowlings 302, 304. A right radiator 406 is disposed laterally inward of the right portions of the upper and lower cowlings 302, 304 and aligned with the right opening 328. A grill 338 is connected between the left portions of the upper and lower cowlings 302, 304 to help prevent entry of large debris through the right opening 328 into the left radiator 406.

Air entering the space enclosed by the front cowling assembly 300 via the front air inlet 332 flows to the radiators 406, 408 for cooling the engine 32. The left opening 326 serves as an air outlet for air flow from the left radiators 406. The opening 335 is therefore referred to hereinafter as the left air outlet 326. The right opening 328 serves as an air outlet for air flow from the right radiator 408. The opening 328 is therefore referred to hereinafter as the right air outlet 328. Although the openings 335, 326, 328 are being described as the air inlet 335 and the air outlets 326, 228, it should be understood that air can enter and exit through each of the openings 326, 328, 335.

Figure 2:
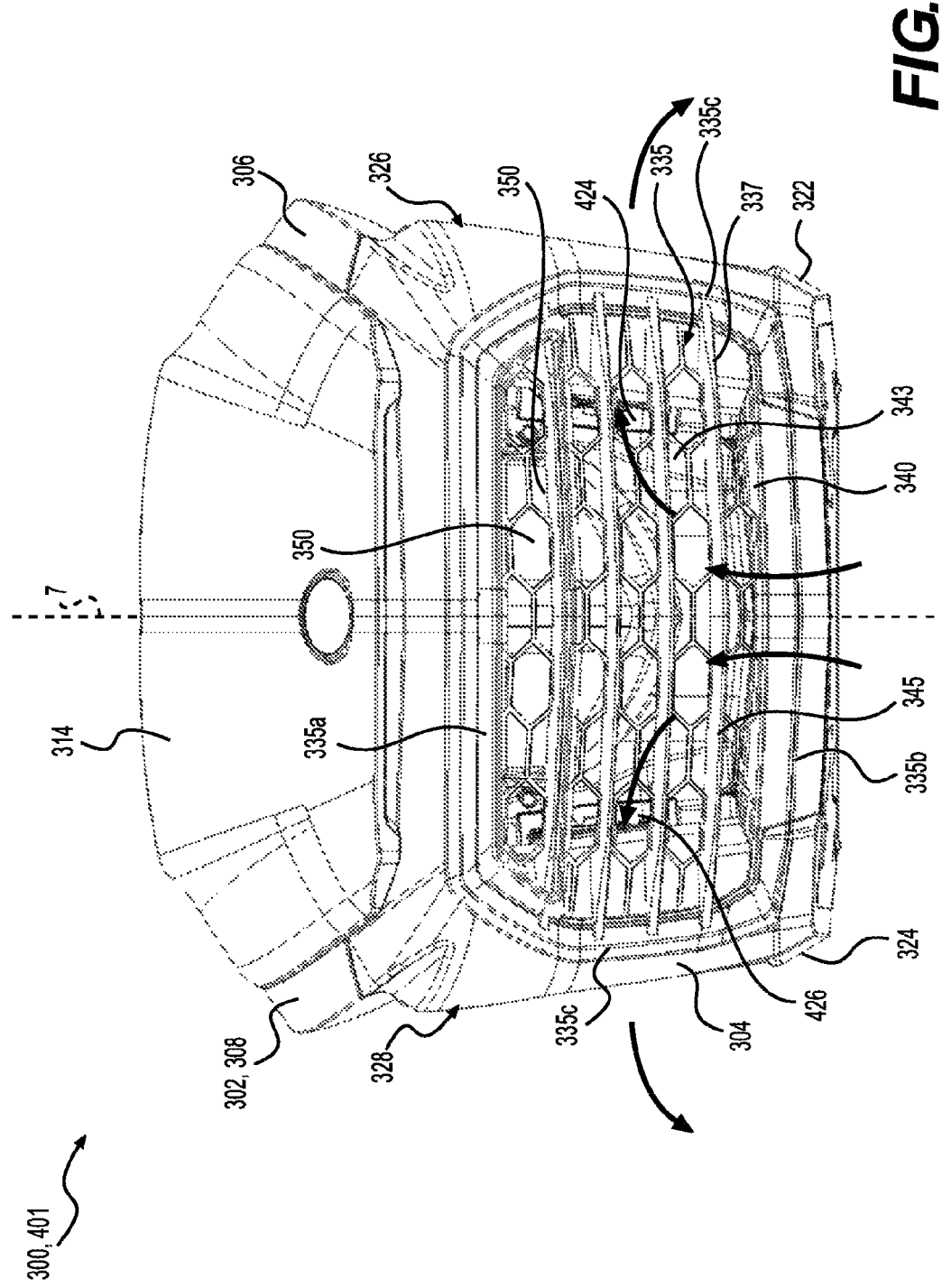
FIG. 2 is a front elevation view of a front cowling assembly and radiator assembly of the vehicle of FIG. 1.

As can be seen in FIG. 2, the front cowling assembly 300 also includes a deflector 350 disposed below the hood 314 and rearward of the inlet 335. The deflector 350 directs airflow from the front air inlet 335 to the left and right radiators 406, 408. The deflector 350 will be described below in further detail.

Figure 7:
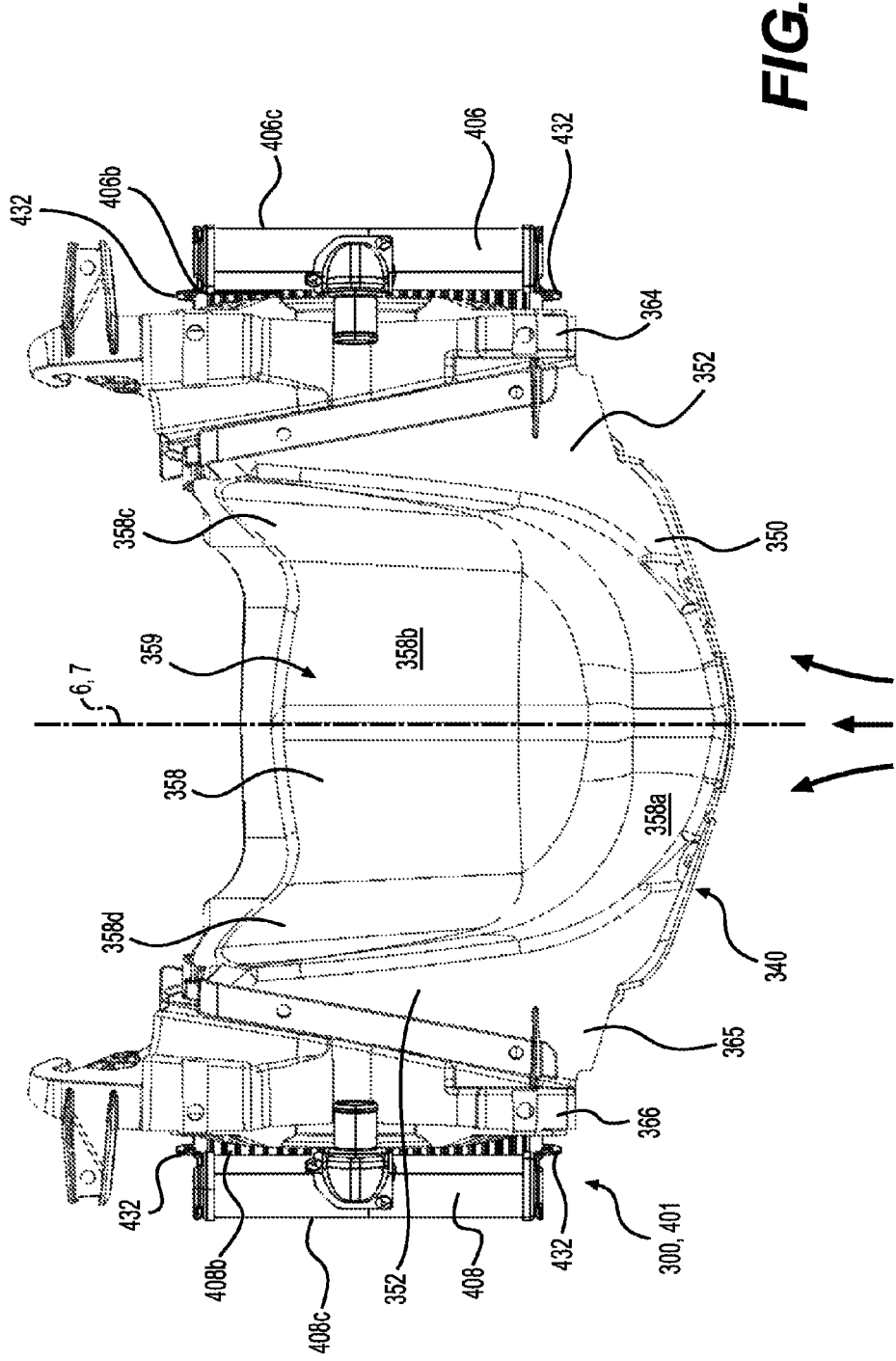
FIG. 7 is a top plan view of the radiator assembly and deflector of FIG. 6 with the storage bin being removed for clarity.
Figure 8:
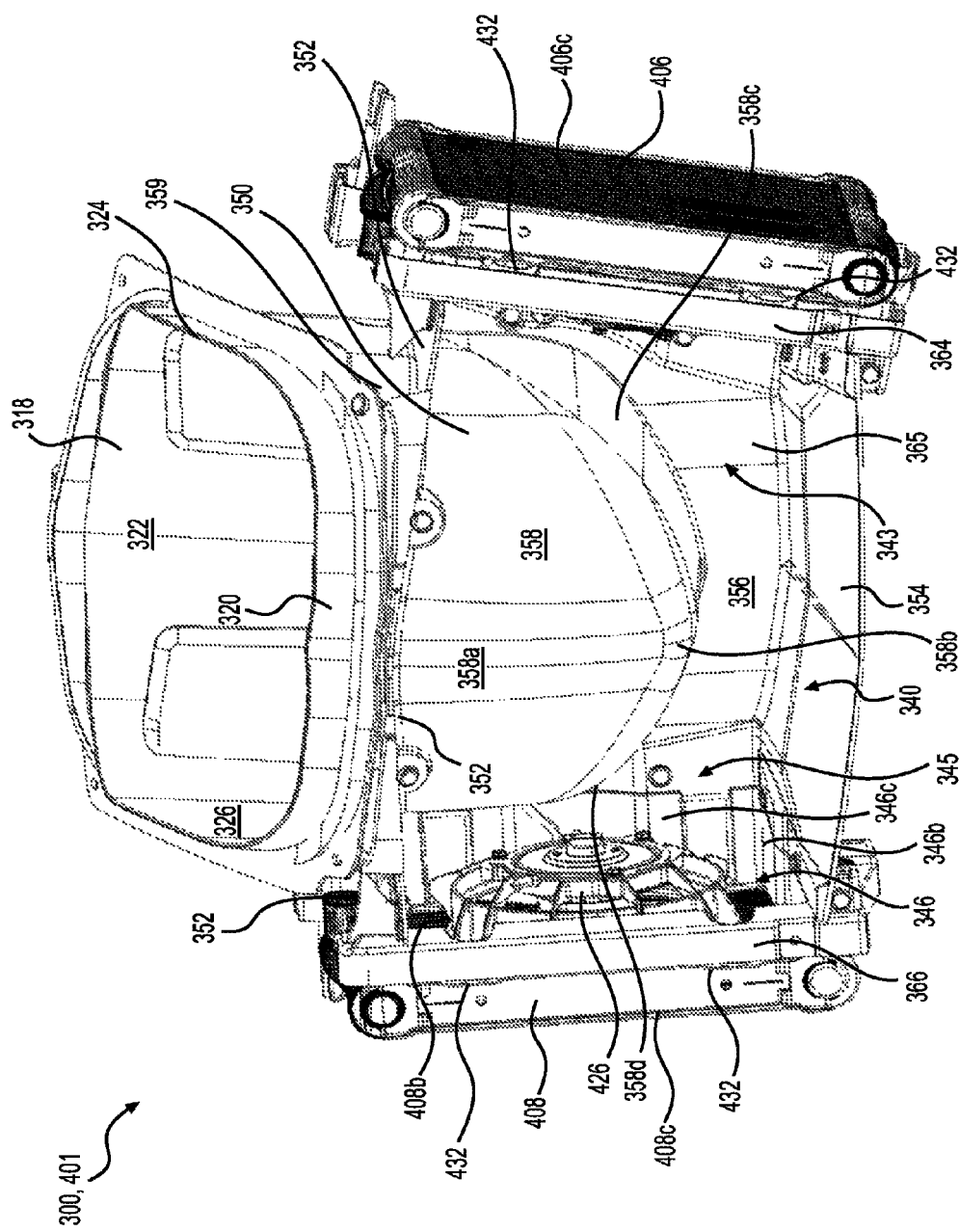
FIG. 8 is a perspective view taken from a front, left side, of the radiator assembly, deflector and storage bin of FIG. 6.
Figure 10:
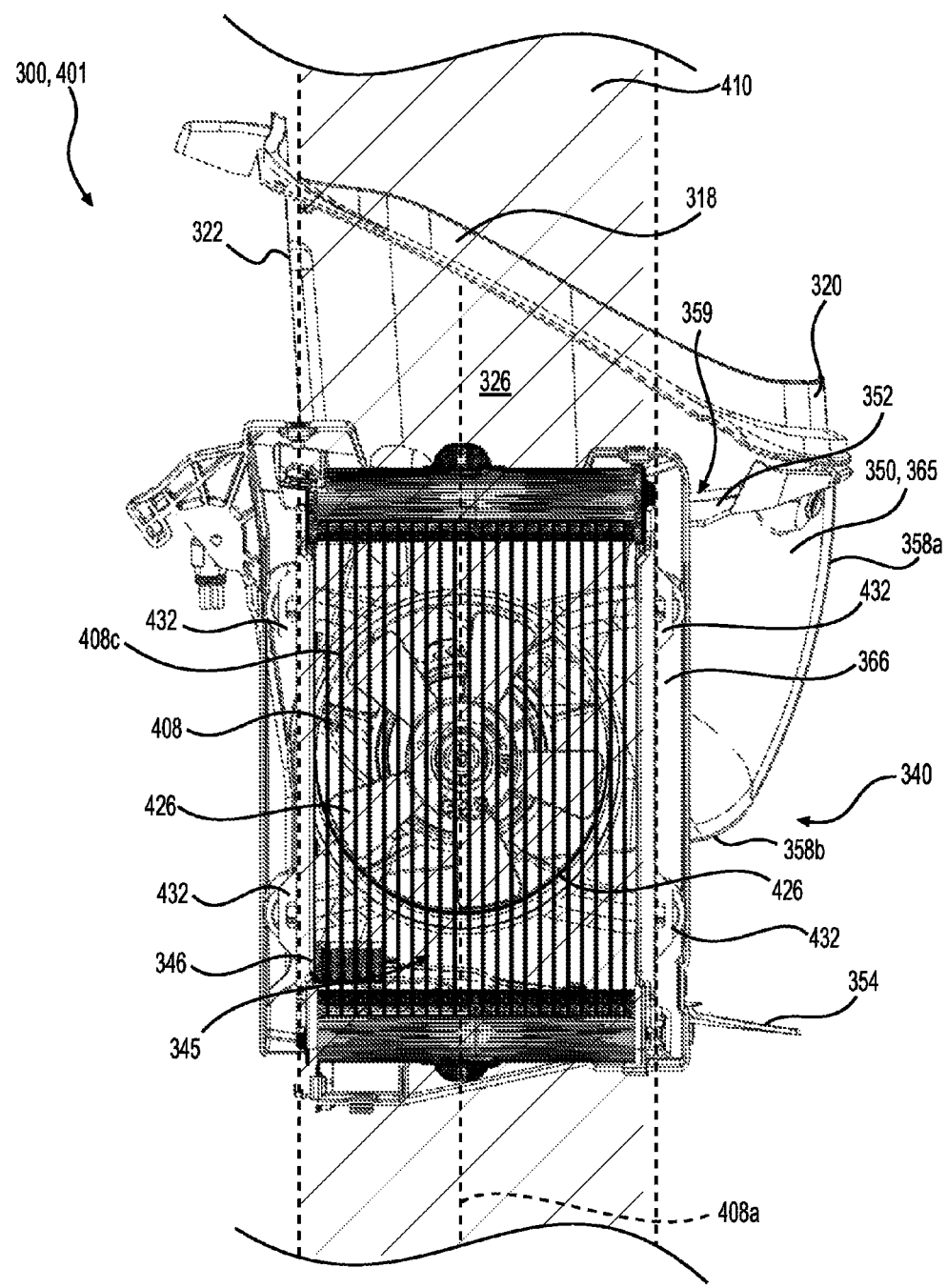
FIG. 10 is a right side elevation view of the radiator assembly, deflector and storage bin of FIG. 6.
Figure 11:
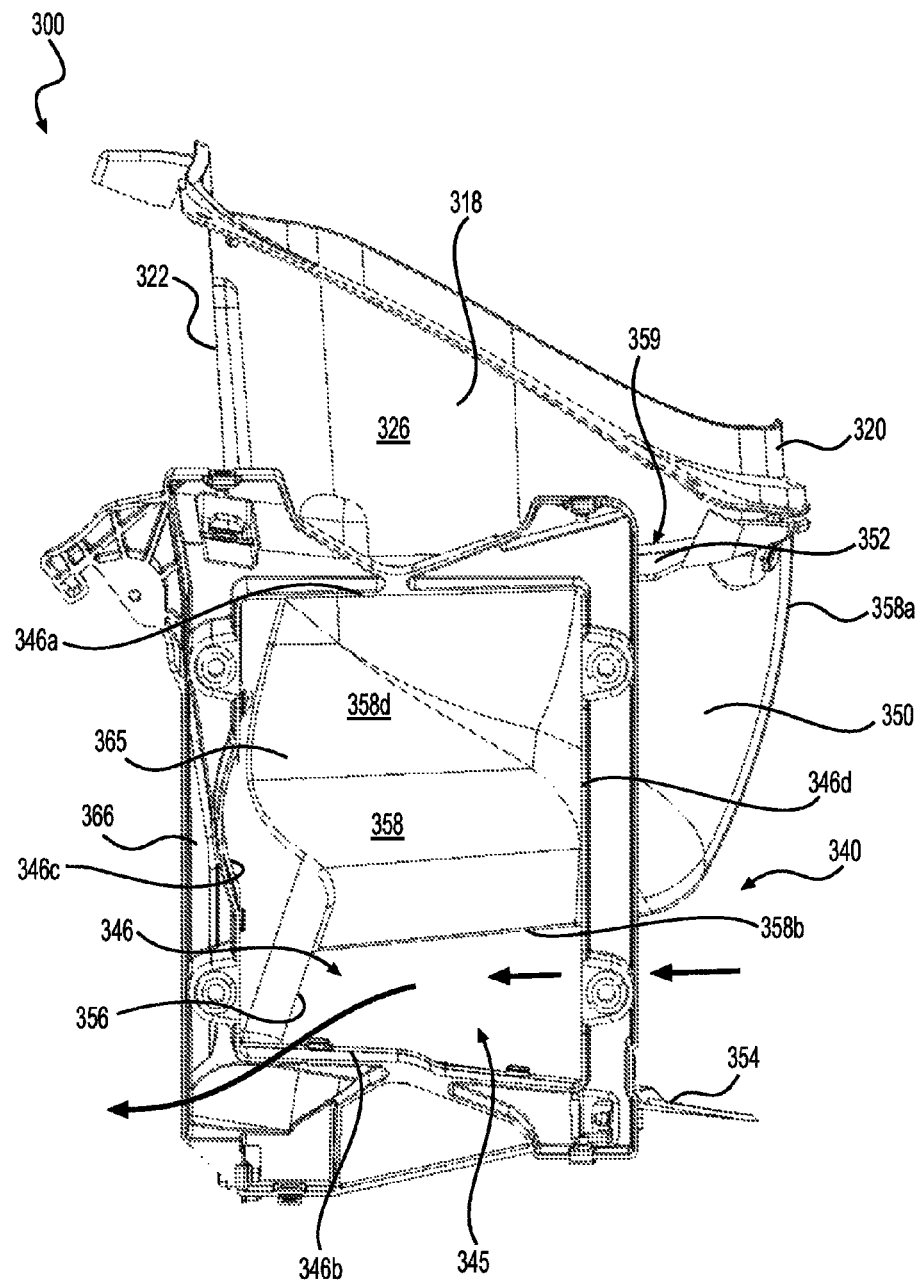
FIG. 11 is a right side elevation view of the deflector and storage bin of FIG. 6, with the radiator assembly being removed for clarity.

With reference to FIGS. 8, 10 and 11, the storage bin 318 is disposed behind and above the deflector 350. The storage bin 318 is open at a top thereof and has a front wall 320, a rear wall 322, a left side wall 324, a right side wall 326, and a bottom 328 (FIG. 7). The upper edge of the front wall 320 is disposed vertically lower than the upper edge of the rear wall 322. The upper edge of the left side wall 324 extends continuously upwards from the front wall 320 to the rear wall 322. The upper edge of the right side wall 326 extends continuously upwards from the front wall 320 to the rear wall 322. It is contemplated that the storage bin 318 could be shaped differently than as shown herein. The storage bin 318 is fastened to the deflector 350 along its front and top edge. It is contemplated that the storage bin 318 could be fastened to other portions of the front cowling assembly 300, such as the upper cowling 302. As can be seen in FIG. 14, the storage bin 318 is also fastened to a front portion of the vehicle frame 12.

The above-described arrangement is only one possible implementation of a front cowling assembly 300. For example, it is contemplated that the left, right and upper cowling portions 306, 308, 310 could be formed as separate pieces that are connected together to form the upper cowling 302.

The deflector 350 will now be described in more detail with reference to FIGS. 4 to 16.

The deflector 350 is formed by three separate deflector portions that are fastened together: a left portion 364, a central portion 365 and a right portion 366. The left and right portions 364, 366 also serve as a radiator mounting frame for the left and right radiator 406, 408 respectively. The left and right portions 364, 366 are each fastened to the central portion 365. It is contemplated that the portions 364, 365, 366 could be formed integrally.

The deflector 350 has a top deflector wall 352, a bottom deflector wall 354, a rear deflector wall 356, and a central deflector wall 358. The deflector 350 defines a front opening 340, a left opening 344 and a right opening 346.

Figure 4:
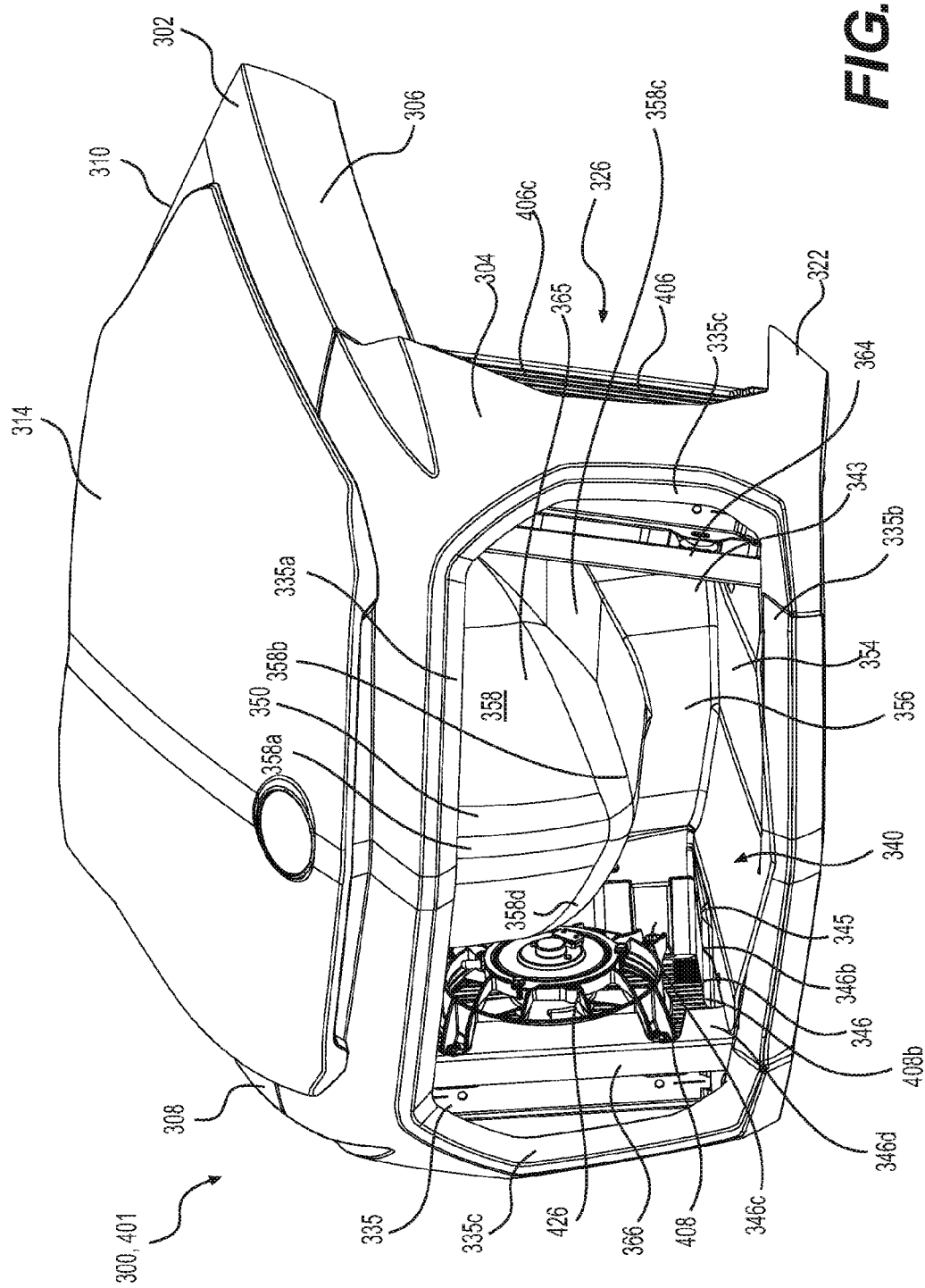
FIG. 4 is a perspective view taken from a front, left side, of the front cowling assembly and radiator assembly of FIG. 2 with a front grill and a left side grill removed for clarity.
Figure 9:
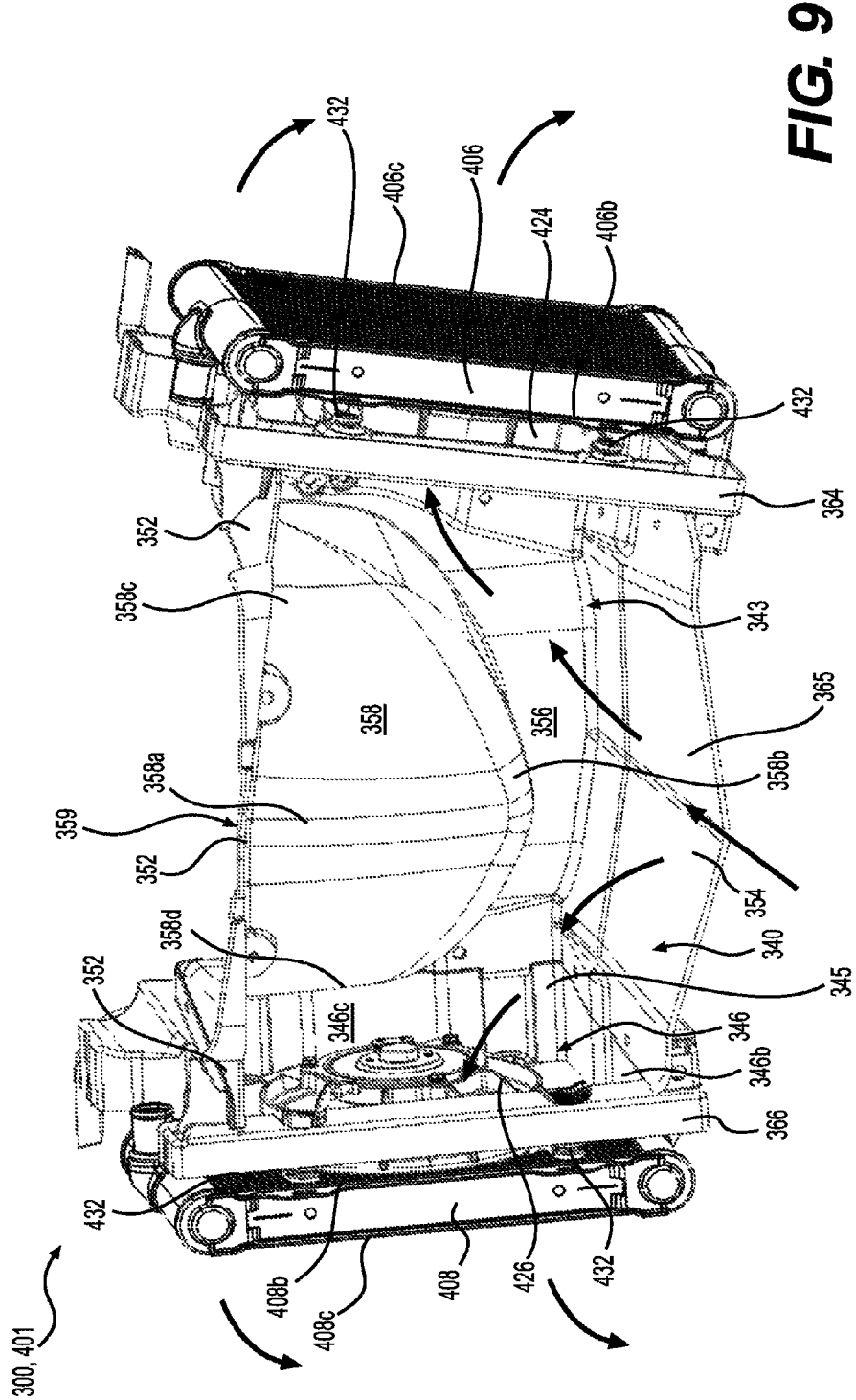
FIG. 9 is a perspective view, taken from a front, left side, of the radiator assembly and deflector of FIG. 6 with the storage bin removed for clarity.

With reference to FIGS. 7, 9 and 10, the top deflector wall 352 extends rearwards along a left and right side of the central deflector wall 358 and the storage bin 318. The central deflector wall 358 extends downwards from the top deflector wall 352. As can be seen in FIGS. 2 and 4, the top edge 335a of the air inlet 335a is disposed slightly below the top deflector wall 352 is disposed vertically slightly above the top edge 335a of the lower cowling air inlet 335 to ensure that airflow is deflected into the front air inlet 340 instead of passing over the front air inlet 340. It is contemplated that the top deflector wall 350a could be vertically aligned with the top edge 335a of the lower cowling air inlet 335.

Figure 12:
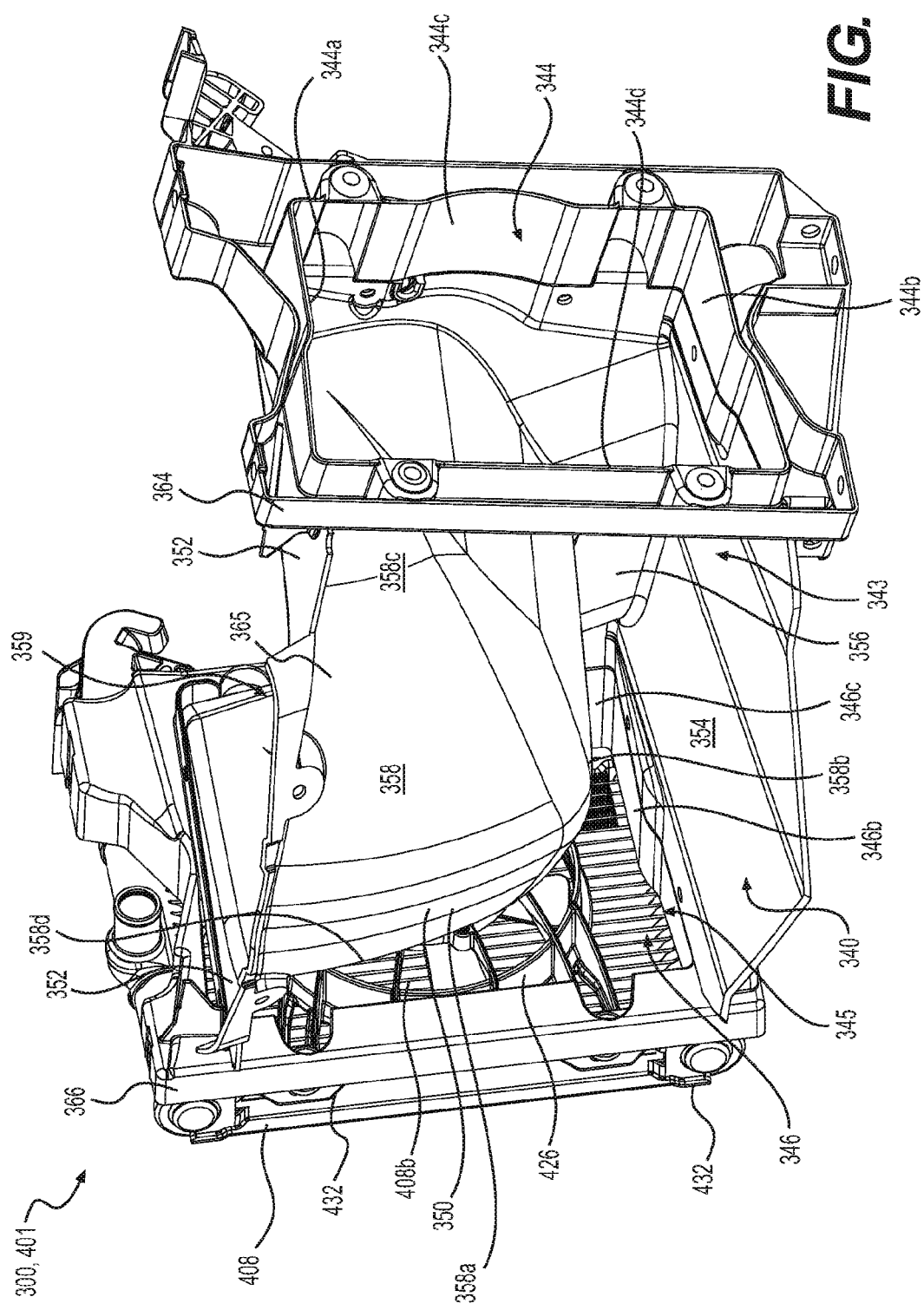
FIG. 12 is a perspective view taken from a front, left side, of the right radiator of the radiator assembly and the deflector of FIG. 6, with the left radiator being removed for clarity.

As can be seen best in FIG. 4, a front edge of the bottom deflector wall 354 is disposed the bottom edge 335b of the lower cowling air inlet 335. The bottom deflector wall 354 extends rearwards from the bottom edge 335b of the lower cowling air inlet 335. The right half of the bottom deflector wall 354 is inclined gently upwardly from the middle towards the right edge thereof. The left half of the bottom deflector wall 354 is inclined gently upwardly from the middle towards the left edge thereof. As can be seen in FIG. 12, the bottom deflector wall 354 slopes gently upwardly and rearwardly from the lower cowling inlet 335 to the rear deflector wall 256.

Figure 6:
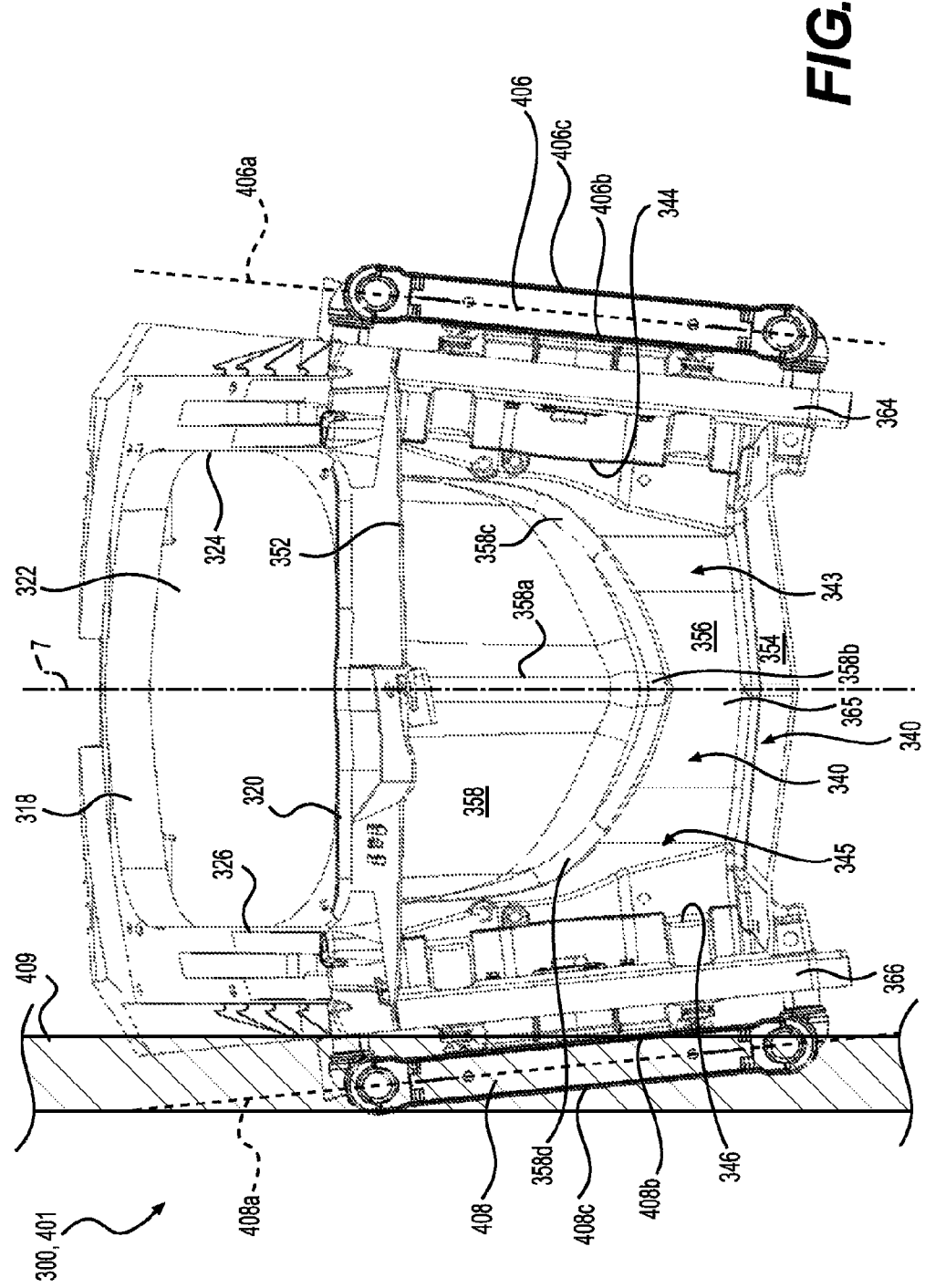
FIG. 6 is a perspective view taken from a front, left side, of the radiator assembly, and a deflector and a lower portion of a storage bin of front cowling assembly of FIG. 5.

As can be seen in FIGS. 4 and 6, the rear deflector wall 356 extends vertically upwards from the rear end of the bottom deflector wall 354. The central deflector wall 358 protrudes forwardly and upwardly from a central and upper portion of the rear deflector wall 356 to the top deflector wall 352. The rear deflector wall 356 extends along the left side of the central deflector wall 258 from the rear end of the bottom deflector wall 354 to the rear end of the top deflector wall 352. The rear deflector wall 356 also extends along the right side of the central deflector wall 258 from the rear end of the bottom deflector wall 354 to the rear end of the top deflector wall 352.

On the right side, the top deflector wall 352, the bottom deflector wall 354 and the rear deflector wall 356 extend continuously from the central deflector portion 365 to the right deflector portion 366. On the left side, the top deflector wall 352, the bottom deflector wall 354 and the rear deflector wall 356 extend continuously from the central deflector portion 365 to the left deflector portion 364.

Figure 13:
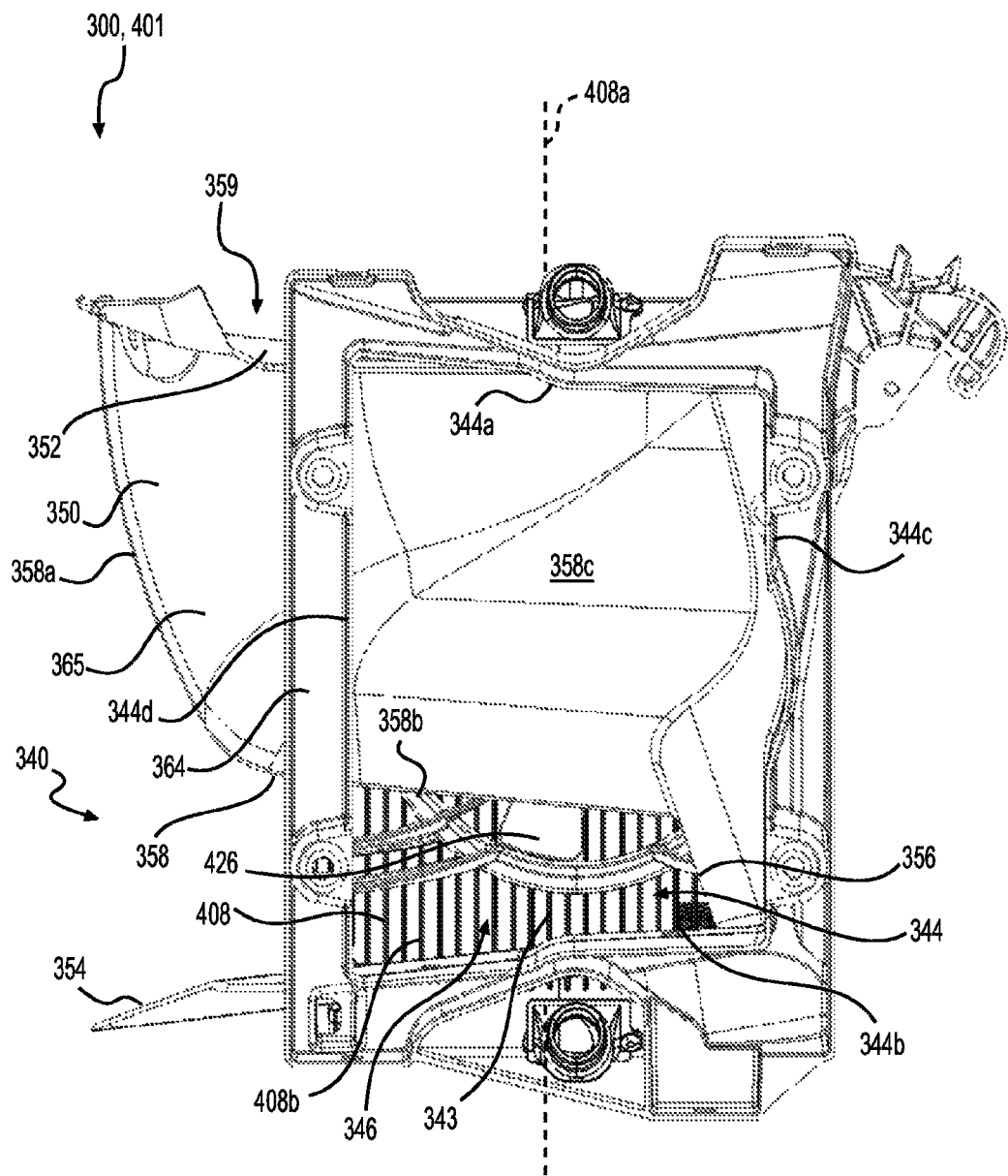
FIG. 13 is a left side elevation view of the right radiator and deflector of FIG. 12.

With reference to FIGS. 11 to 13, the central portion of the rear deflector wall 356 is sloped rearwardly between the central deflector wall 358 and the bottom deflector wall 354. The left portion of the rear deflector wall 356 curves leftwardly and rearwardly from the central deflector wall 358. The right portion of the rear deflector wall 356 curves rightwardly and rearwardly from the central deflector wall 358.

With reference to FIGS. 4 to 13, the central deflector wall 358 has a front portion 358a that extends vertically. The vertical front portion 358a of the central deflector wall 358 is disposed just rearward of the air inlet 335. A bottom portion 358b of the central deflector wall 358 extends generally horizontally from the vertical front portion 358a to the rear deflector wall 356. The bottom portion 358b of the central deflector wall 358 is spaced from the bottom deflector wall 354.

As can be seen clearly in FIG. 6, a left portion 358c of the central deflector wall 358 extends rearwardly from the left side of the front portion 358a to the rear wall 356. A right portion 358d of the central deflector wall 358 extends rearwardly from the right side of the vertical front portion 358a to the rear wall 356. As can be seen clearly in FIGS. 7, 10 and 13, the left portion 358c extends upwardly from the left side of the bottom portion 358a to the top wall 352, and the right portion 358d extends upwardly from the right side of the bottom portion 358b to the top wall 352.

When viewed from the front as shown in FIGS. 2 and 6, the central deflector wall 358 forms a generally U-shaped connection with the rear deflector wall 356. The central deflector wall 358 is generally normal to the rear deflector wall 356 at the connection therebetween. It is contemplated that the connection between the central deflector wall 358 and the rear deflector wall 356 could be curved instead of angled.

When viewed from the top as shown in FIG. 7, the central deflector wall 358 forms a generally U-shaped connection with the top wall 352. The central deflector wall 358 is generally normal to the top deflector wall 352 at the connection therebetween. It is contemplated that the connection between the central deflector wall 358 and the top deflector wall 352 could be curved instead of angled.

As best seen in FIG. 7, the central deflector wall 358 projecting forwardly from the rear deflector wall 356 and downwardly from the top wall 352 defines a cavity 359. The cavity 359 is thus facing upwardly and rearwardly.

As best seen in FIGS. 8 and 16, the storage bin 318 is disposed in the cavity 359 formed by the central deflector wall 358. The front surface of the front wall 320 of the storage bin 318 is contoured to be congruous with the rear surface of the front portion 358a of the central wall 358. The lower surface of bottom storage bin wall 328 is congruous with the upper surface of the bottom portion 358b of the central wall 358. The left surface of the left storage bin wall 322 is congruous with the right surface of the left side portion 358c of the central wall 358. The right surface of the right storage bin wall 322 is congruous with the left surface of the right side portion 358d of the central wall 358.

Figure 5:
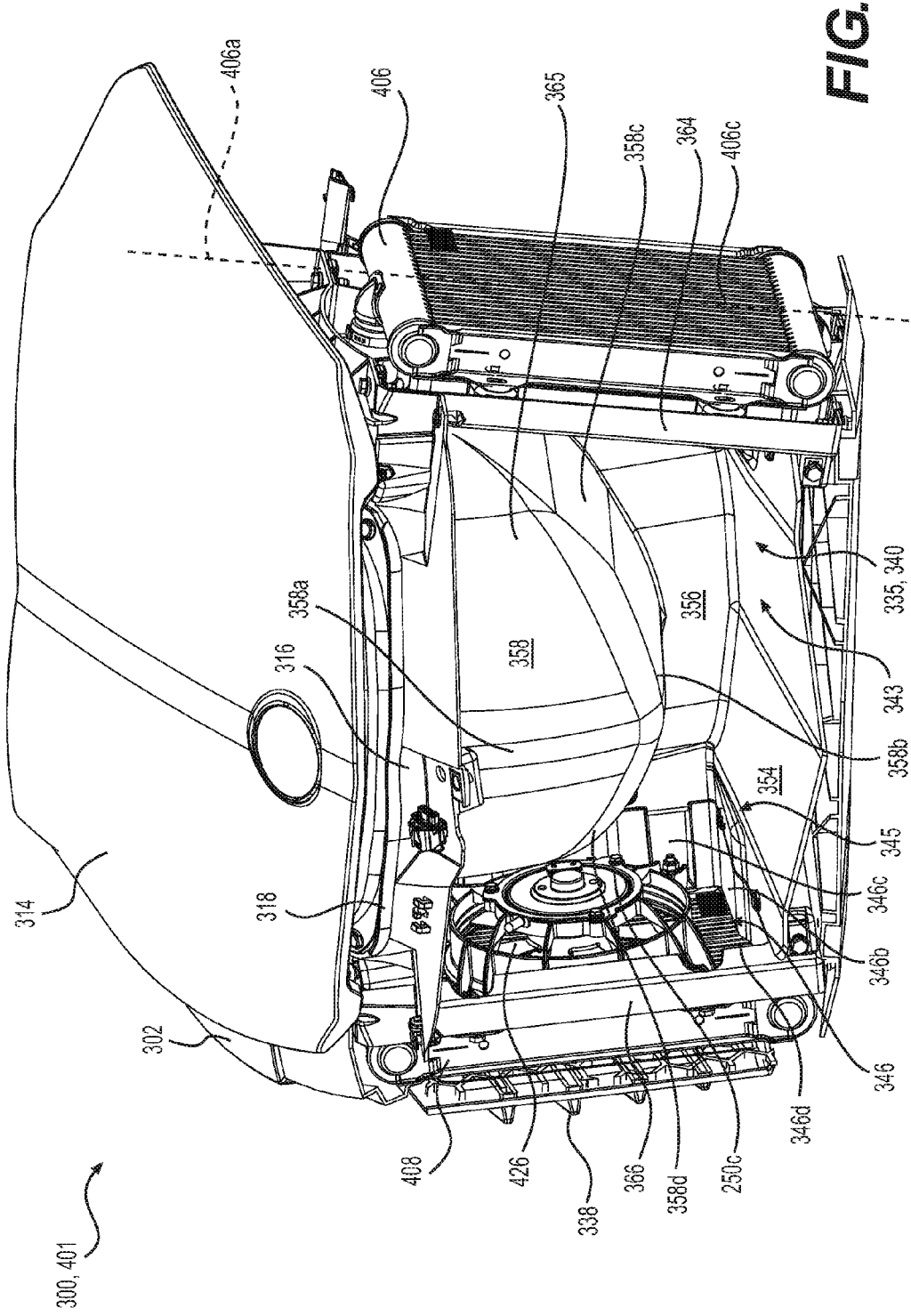
FIG. 5 is a perspective view taken from a front, left side, of the front cowling assembly and radiator assembly of FIG. 2 with the front and left side grills, a lower cowling and a left portion of an upper cowling removed for clarity.

With reference to FIGS. 4 to 6, the front opening 340 defined by the deflector faces forwardly and is aligned with the air inlet 335 defined in the lower cowling 304. In the vertical direction, the front opening 340 is defined between the front edges of the top deflector wall 352 and the bottom deflector wall 354. In the lateral direction, the opening 340 is defined between the left deflector portion 364 which is disposed rightwardly (laterally inwardly) of the left edge 335c of the lower cowling air inlet 335 and the right deflector portion 366 which is disposed leftwardly (laterally inwardly) of the right edge 335c of the lower cowling air inlet 335.

As can be seen in FIGS. 12 and 13, the left opening 344 is defined in the left side of the deflector 350 in the in the left deflector portion 364. The left opening 344 is disposed rearward of the front openings 340, 335. The left opening 344 is disposed laterally and generally parallel to the longitudinal centerplane 7. The left opening 344 is aligned with the left opening 326 (FIGS. 2 and 3A) defined between the left upper and lower cowling portions 306, 322. The left radiator 406 is mounted on a left (laterally outer) surface of the left mounting portion 364 around the left opening 344.

With reference to FIGS. 12 and 13, the left opening 344 is generally rectangular and defined by a rear wall 344c, top wall 344a, a front wall 344d, and a bottom wall 344b of the left deflector portion 364. The front wall 344d of the left opening 344 extends laterally and vertically. The front wall 344d of the left opening 344 is disposed rearward of the front portion 358a of the central deflector wall 358 as can be seen best in FIG. 13. The vertically and laterally extending rear wall 344c of the left opening 344 is formed by the rear deflector wall 356. The longitudinally and horizontally extending top wall 344a of the left opening 344 is formed by the top deflector wall 352. The longitudinally and horizontally extending bottom wall 344b of the left opening 344 is formed by the bottom deflector wall 354.

With reference to FIGS. 8 to 12, the deflector 350 defines a left passage 343 fluidly connecting the front opening 340 with the left opening 344. The left passage 343 is defined by the walls 352, 354, 356 and 358a, 358b, 358c of the deflector 350.

Similarly, as can be seen in FIGS. 8 and 9, the right opening 346 is defined in the right side of the deflector 350 rearward of the front openings 340, 335. The right opening 346 is defined in the right deflector portion 366. The right opening 346 is disposed laterally and generally parallel to the longitudinal centerplane 7. The right opening 346 is aligned with the right opening 328 (FIG. 3B) defined between the right upper and lower cowling portions 308, 324. The right radiator 408 is mounted on a right (laterally outer) surface of the left mounting portion 364 around the right opening 346.

With reference to FIGS. 8 to 12, the right opening 346 is generally rectangular and defined by a rear wall 346c, top wall 346a, a front wall 346d, and a bottom wall 346b of the right deflector portion 366. The front wall 346d of the right opening 346 extends laterally and vertically. The front wall 346d of the right opening 346 is disposed rearward of the front portion 358a of the central deflector wall 358 as can be seen best in FIG. 11. The vertically and laterally extending rear wall 346c of the right opening 346 is formed by the rear deflector wall 356. The longitudinally and horizontally extending top wall 346a of the right opening 346 is formed by the top deflector wall 352. The longitudinally and horizontally extending bottom wall 346b of the right opening 346 is formed by the bottom deflector wall 354.

The deflector 350 defines a right passage 345 fluidly connecting the front opening 340 with the right opening 346. The right passage 345 is defined by the walls 352, 354, 356 and 358a, 358b, 358d of the deflector 350.

With reference to FIGS. 1 and 9, when the vehicle 10 is moving in a forward direction, air enters through the front openings 335, 340. The openings 335, 340 are thus referred to as the air inlets 335, 340. The side openings 326, 328, 344, 346 are therefore referred to as the air outlets 326, 328, 344, 346. It should however be understood that air could also enter through the side openings 328, 346, 326, 344 enter and exit through the front openings 340, 335.

The radiator assembly 401 will now be described with reference to FIGS. 2 to 16.

With reference to FIG. 4, the radiator assembly 401 is disposed in the space enclosed by the front cowling assembly 300. The radiator assembly 401 includes the left radiator 406, a left fan 424, the right radiator 408, and a right fan 426.

With reference to FIGS. 6 and 7, the left radiator 406 is disposed on a left side of the longitudinal centerline 6 and mounted to the left side of the left deflector portion 364 around the left air outlet 344. The right radiator 408 is disposed on a right side of the longitudinal centerline 6 and mounted to the right side of the right deflector portion 366 around the right air outlet 346.

With reference to FIGS. 1 and 9, when the vehicle 10 is moving in a forward direction, cool air at a front of the vehicle 10 flows rearwardly (with respect to the vehicle 10) into the air inlets 335, 340. The central wall 358 of the deflector 350 directs a portion of the cool air from the air inlet 340 towards the right air outlet 346 via the right air passage 345. Air flowing out of the right air outlet 346 flows through the right radiator 408 thereby absorbing heat from the engine coolant flowing inside the right radiator 408. Air flowing through the right radiator 408 flows rightwardly, downwardly and rearwardly away from the vehicle 10 as the vehicle 10 moves in a forward direction. It is contemplated that the air flow could be in a rightward direction without also being downwardly. The central deflector wall 358 of the 350 directs another portion of the cool air from the air inlet 340 towards the left air outlet 344 via the left air passage 343. Air flowing out of the left air outlet 344 flows through the left radiator 406 thereby absorbing heat from the engine coolant flowing inside the left radiator 406. Air flowing through the left radiator 406 flows leftwardly, downwardly and rearwardly away from the vehicle 10 as the vehicle 10 moves in a forward direction. It is contemplated that the air flow could be in a leftward direction without also being downwardly.

When the vehicle 10 is moving in a rearward direction, moving in a forward direction at low speeds, or stationary with the engine operating, the fans 426, 428 help to create air flow into the air inlet 335, 340 and laterally outwardly through the radiators 406, 408 for cooling the engine 32.

It is contemplated that the fans 426, 428 could create an airflow in the opposite direction when the vehicle 10 is moving in a reverse direction than when the vehicle 10 is moving in a forward direction, i.e. during forward direction motion, the airflow could flow into the air inlet 335, 340 and laterally outwardly through the radiators 406, 408, and during reverse direction motion, airflow could flow laterally inwardly through the radiators 406, 408 and out through the front inlets 335, 340.

Each of the left and right radiators 406, 408 is generally rectangular and has an upper edge, a lower edge, a front edge and a rear edge. A line 406a (FIG. 6) bisects the upper and lower edges of the left radiator 406. The left radiator 406 has a right surface or inlet surface 406b. The left radiator 406 has a left surface or outlet surface 406c. A line 408a (FIG. 10) bisects the upper and lower edges of the right radiator 408. The right radiator 408 has a left surface or inlet surface 408b. The right radiator 408 has a left surface or outlet surface 408c.

The right radiator 408 and the right fan 426 are respectively a mirror image of the left radiator 406 and the left fan 424. As such only the right radiator 408 and the right fan 426 will be described below.

With reference to FIG. 10, right radiator 408 is disposed with its upper and lower edges disposed substantially horizontally. The front and rear edges of the right radiator 408 are disposed in a substantially vertical plane when viewed from the side. The line 408a is also disposed in a vertically and laterally extending plane when viewed from a side as in FIG. 10.

When viewed from the front (FIG. 15) or the rear (FIG. 16), the right radiator 408 is inclined such that its upper edge is disposed laterally outwardly (rightwardly) of its lower edge. Thus, the line 408a bisecting the upper and lower edges of the right radiator 408 is disposed at an angle to the longitudinal centerplane 7. The line 408a is inclined laterally outwardly (rightwardly) from the lower edge to the upper edge of the right radiator 408.

It is however contemplated that the right radiator 408 could be disposed with its upper and lower edges being laterally aligned. In this case, the line 408a would be parallel to the longitudinal centerplane 7 when viewed from the front or rear.

It is contemplated that the right radiator 408 could be disposed with its upper and lower edges being disposed at an angle with respect to the horizontal and with its front and rear edges being disposed at an angle to the vertical. In this case, when viewed from a lateral side of the vehicle 10, the line 408a would be disposed at an angle with respect to a vertical plane extending laterally.

With reference to FIGS. 6 and 10, the right radiator 408 has a lateral projection 409 (FIG. 6) onto a laterally extending vertical plane, and a longitudinal projection 410 (FIG. 10) onto a longitudinally extending vertical plane. The lateral projection 409 of the radiator 408 is smaller than its longitudinal projection 410. As such a vehicle 10 having the radiator assembly 401 described above could be laterally narrower than a vehicle 10 where the radiators are aligned with their inlet surfaces being generally normal to the longitudinal centerline 6.

With reference to FIGS. 14 to 16, the right radiator 408 is disposed forward of the front suspension assembly 17 so that air flow to the radiator 408 is not hindered by the front suspension assembly 17. The upper edge of the right radiator 408 extends above the right upper A-arm 80 and below the upper end of the right shock absorber 84. The lower edge of the right radiator 408 is disposed below the right lower A-arm 82.

With reference to FIG. 14, the right radiator 408 is disposed leftwardly (laterally inwardly) of a vertical plane 40a disposed parallel to the longitudinal centerplane 7 and passing through the location 40c on the driver footrest 40 where the driver footrest 40 is connected to the vehicle frame 12. The right radiator 408 is disposed rightwardly (laterally outwardly) of a vertical plane 42a disposed parallel to the longitudinal centerplane 7 and passing through the location 42c on the passenger footrest 42 where the passenger footrest 42 is connected to the vehicle frame 12. The right radiator 408 is disposed leftwardly (laterally inwardly) of the right wheel 14 (shown schematically in FIG. 14).

With reference to FIG. 10, the front edge of the right radiator 408 is disposed rearwardly of the front wall 320 of the storage bin 318. The rear edge of the right radiator 408 is generally aligned with the rear wall 322 of the storage bin 318. It is contemplated that the right radiator 408 could extend further forward and/or rearward than as shown. The upper edge of the right radiator 408 is disposed below the upper edge of the front wall 320 of the storage bin 318. The lower edge of the right radiator 408 is disposed below the storage bin 318, and bottom wall 354 of the deflector 350. It is contemplated that the right radiator 408 could extend further upward and/or downward than as shown.

With reference to FIG. 10, the right radiator 408 has two attachment brackets 432 on its front edge and two attachment brackets 432 on its rear edge. The right radiator 408 is connected to the right deflector portion 366 by the attachment brackets 432.

With reference to FIGS. 6, 15 and 16, when viewed from the front or rear, the right radiator 408 is mounted to the right side of the air outlet 346 so that its inlet surface 408b is facing leftwardly (laterally inwardly) towards the right outlet 346, the longitudinal centerplane 7 and the central deflector wall 358. It is also contemplated that the radiator 408 could be disposed in the right passage 345 with the inlet surface 408b facing away from the right outlet 346 and towards the longitudinal centerplane 7.

The right fan 426 is mounted facing the inlet surface 408b of the right radiator 408. The right fan 426 is thus disposed laterally between the right radiator 408 and the central deflector wall 358. The right fan 426 is disposed in the right outlet 346. It is contemplated that the right fan 426 could not be disposed in the outlet 346. It is also contemplated that the right fan 426 could be disposed laterally outwardly of the right radiator 408 so that the right fan 436 is facing the outlet surface 408c.

Modifications and improvements to the above-described implementations of the present vehicle may become apparent to those skilled in the art. The foregoing description is intended to be exemplary rather than limiting. The scope of the present technology is therefore intended to be limited solely by the scope of the appended claims.

What is claimed is:

1. A vehicle comprising:
   a frame defining a longitudinal centerplane;
   a straddle seat supported by the frame;
   a left front wheel and a right front wheel operatively connected to the frame;
   at least one rear wheel connected to the frame;
   a motor connected to at least one of the wheels;
   a front cowling assembly being supported by the frame;
   an air inlet defined in the front cowling assembly, at least a portion of the air inlet facing forwardly;
   an air outlet defined in the front cowling assembly and fluidly communicating with the air inlet, at least a portion of the air outlet facing laterally outwardly; and
   a radiator fluidly communicating with the motor and being enclosed at least in part by the front cowling assembly, at least a portion of the air flowing from the air inlet flowing through the air outlet and through the radiator, a projection of the radiator on a vertical plane disposed longitudinally being greater than a projection of the radiator on a vertical plane disposed laterally.

2. The vehicle of claim 1, wherein the radiator is connected to the front cowling assembly around the air outlet.

3. The vehicle of claim 1, wherein the front cowling assembly further comprises a deflector directing air from the air inlet towards the air outlet.

4. The vehicle of claim 3, wherein the air outlet is defined by the deflector.

5. The vehicle of claim 3, wherein the radiator is connected to the deflector.

6. The vehicle of claim 1, wherein a direction of airflow through the air outlet is at a non-zero angle with respect to a direction of airflow through the air inlet, the angle being greater than 45 degrees and less than 135 degrees.

7. The vehicle of claim 6, wherein the angle is greater than 80 degrees and less than 100 degrees.

8. The vehicle of claim 1, further comprising a fan adapted to force air through the radiator.

9. The vehicle of claim 8, wherein an inlet surface of the radiator faces the fan.

10. The vehicle of claim 1, further comprising:
    a left front suspension assembly connecting the left front wheel to the frame; and
    a right front suspension assembly connecting the right front wheel to the frame,
    wherein the radiator is disposed longitudinally forward of the left and right front suspension assemblies.

11. The vehicle of claim 1, further comprising:
    a left driver footrest connected to the frame and extending leftwardly therefrom, the left driver footrest being disposed vertically lower than the straddle seat; and
    a right driver footrest connected to the frame and extending rightwardly therefrom, the right footrest being disposed vertically lower than the straddle seat,
    wherein the radiator is disposed laterally between at least a portion of the left and right driver footrests.

12. The vehicle of claim 1, wherein:
    the air outlet is a left air outlet, the at least one portion of the left air outlet facing leftwardly;
    the radiator is a left radiator; and
    further comprising:

a right air outlet defined in the front cowling assembly and fluidly communicating with the air inlet, at least a portion of the right air outlet facing rightwardly; and a right radiator fluidly communicating with the motor and being enclosed at least partly by the front cowling assembly, at least a portion of the air flowing from the air inlet flowing through the right air outlet and the right radiator, a projection of the right radiator on a vertical plane disposed longitudinally being greater than a projection of the right radiator on a vertical plane disposed laterally.

13. The vehicle of claim 12, wherein the front cowling assembly further comprises a deflector, the deflector comprising:
a left deflector wall portion directing air from the air inlet towards the left air outlet; and
a right deflector wall portion directing air from the air inlet towards the right air outlet.

14. The vehicle of claim 13, further comprising a storage bin enclosed at least in part by the front cowling assembly, the storage bin being disposed laterally between the left and right radiators, the storage bin being disposed longitudinally rearward of at least a portion of the deflector.

15. The vehicle of claim 14, wherein a front surface of the storage bin is congruous with a rear surface of the deflector.

16. The vehicle of claim 12, further comprising:
a left fan adapted to direct air through the left radiator, an inlet surface of the left radiator facing the left fan; and
a right fan adapted to direct air through the right radiator, an inlet surface of the right radiator facing the right fan.

17. The vehicle of claim 12, further comprising:
a left front suspension assembly connecting the left front wheel to the frame and comprising a left upper A-arm and a left lower A-arm, the left radiator being disposed in front of the left A-arms;
a right front suspension assembly connecting the right front wheel to the frame and comprising a right upper A-arm and a right lower A-arm, the right radiator being disposed in front of the right A-arms.

18. The vehicle of claim 12, further comprising:
a left driver footrest connected to the frame and disposed vertically lower than the straddle seat; and
a right driver footrest connected to the frame and disposed vertically lower than the straddle seat,
wherein:
the left radiator is disposed laterally between at least a portion of the left driver footrest and the longitudinal centerplane; and
the right radiator is disposed laterally between at least a portion of the right driver footrest and the longitudinal centerplane.

19. The vehicle of claim 18, further comprising:
a left passenger footrest connected to the frame, the left passenger footrest being disposed vertically lower than the straddle seat and rearward of the left driver footrest; and
a right passenger footrest connected to the frame, the right passenger footrest being disposed vertically lower than the straddle seat and rearward of the right driver footrest,
wherein:
the left radiator is disposed laterally between at least a portion of the left passenger footrest and the longitudinal centerplane; and
the right radiator is disposed laterally between at least a portion of the right passenger footrest and the longitudinal centerplane.

20. The vehicle of claim 19, wherein:
the left passenger footrest is connected to the frame at a location disposed laterally between the left radiator and the longitudinal centerplane; and
the right passenger footrest is connected to the frame at a location disposed laterally between the right radiator and the longitudinal centerplane.

* * * * *